(12) United States Patent
Dhanda et al.

(10) Patent No.: US 12,063,441 B1
(45) Date of Patent: Aug. 13, 2024

(54) OPTICAL IMAGE STABILIZATION WITH REGION-BASED BLUR REDUCTION

(71) Applicant: Apple Inc., Cupertino, CA (US)

(72) Inventors: Abhishek Dhanda, San Ramon, CA (US); Jianping Zhou, Fremont, CA (US); Kevin A Gross, San Francisco, CA (US); Santiago Alban, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 14 days.

(21) Appl. No.: 17/024,429

(22) Filed: Sep. 17, 2020

Related U.S. Application Data

(60) Provisional application No. 62/907,383, filed on Sep. 27, 2019.

(51) Int. Cl.
  *H04N 23/68* (2023.01)
  *G06F 3/04883* (2022.01)
  *H04N 23/63* (2023.01)

(52) U.S. Cl.
  CPC ....... *H04N 23/687* (2023.01); *G06F 3/04883* (2013.01); *H04N 23/632* (2023.01); *H04N 23/6812* (2023.01); *H04N 23/683* (2023.01)

(58) Field of Classification Search
  CPC .......... G03B 5/04; G03B 13/34; G03B 17/14; G02B 27/646; G02B 7/04
  USPC ....... 348/208.14, 208.7, 208.5, 208.4, 208.2, 348/208.99
  See application file for complete search history.

(56) References Cited

U.S. PATENT DOCUMENTS

| | | | | |
|---|---|---|---|---|
| 2013/0163972 | A1* | 6/2013 | Miyazawa | G03B 15/00 396/55 |
| 2015/0358545 | A1* | 12/2015 | Wakamatsu | H04N 5/2176 348/208.1 |
| 2016/0261806 | A1* | 9/2016 | Honjo | H04N 23/6812 |
| 2016/0353013 | A1* | 12/2016 | Ugawa | H04N 23/62 |
| 2018/0063399 | A1* | 3/2018 | Matsuyama | H04N 5/2329 |
| 2019/0020823 | A1* | 1/2019 | Jeon | G06V 20/20 |
| 2019/0064475 | A1* | 2/2019 | Kobayashi | H02K 41/0354 |
| 2019/0132520 | A1* | 5/2019 | Gupta | H04N 5/232127 |
| 2019/0174062 | A1* | 6/2019 | Miyahara | H04N 23/6812 |

\* cited by examiner

*Primary Examiner* — Xi Wang
(74) *Attorney, Agent, or Firm* — Robert C. Kowert; Kowert, Hood, Munyon, Rankin & Goetzel, P.C.

(57) ABSTRACT

Various embodiments include implementing optical image stabilization (OIS) in a camera module. For example, a controller may control an actuator of the camera module to move a lens group and/or an image sensor of the camera module to provide OIS movement. In various embodiments, OIS movement control is implemented according to a region-based blur reduction model that effects a greater reduction in blur associated with a target region of an image sensor, relative to one or more other regions of the image sensor.

20 Claims, 14 Drawing Sheets

500a

OPTICAL IMAGE STABILIZATION WITH REGION-BASED BLUR REDUCTION

This application claims benefit of priority to U.S. Provisional Application No. 62/907,383, filed Sep. 27, 2019, titled "Optical Image Stabilization for Reducing Blur in Region of Interest", which is hereby incorporated by reference in its entirety.

BACKGROUND

Technical Field

This disclosure relates generally to optical image stabilization (OIS) movement control with region-based blur reduction.

Description of the Related Art

The advent of small, mobile multipurpose devices such as smartphones and tablet or pad devices has resulted in a need for high-resolution, small form factor cameras for integration in the devices. Some cameras may incorporate optical image stabilization (OIS) mechanisms that may sense and react to external excitation/disturbance by adjusting location of the optical lens on the X and/or Y axis in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. In some such AF mechanisms, the optical lens is moved as a single rigid body along the optical axis of the camera to refocus the camera.

BRIEF DESCRIPTION OF THE DRAWINGS

FIG. 3A shows a plot illustrating an example of uncompensated blur resulting from motion (e.g., rotational motion) of a camera module (and/or a device comprising the camera module). FIG. 3B shows a plot illustrating an example of blur resulting from the motion indicated in FIG. 3A, where the blur is compensated via OIS that is designed to minimize blur at a center point of an image (also referred to herein as a "center point-based scheme"). FIG. 3C shows a plot illustrating an example of blur resulting from the motion indicated in FIG. 3A, where the blur is compensated using OIS movement control with region-based blur reduction (also referred to herein as a "region-based scheme"), in accordance with some embodiments. FIG. 3D shows a plot illustrating an example of a "blur over time" comparison between the center point-based scheme implemented in FIG. 3B and the region-based scheme implemented in FIG. 3C.

FIG. 5A shows a plot illustrating an example of uncompensated blur resulting from motion (e.g., rotational motion) of a camera module (and/or a device comprising the camera module). FIG. 5B shows a plot illustrating an example of blur resulting from the motion indicated in FIG. 5A, where the blur is compensated via OIS that is designed to minimize blur at a center point of an image. FIG. 5C shows a plot illustrating an example of blur resulting from the motion indicated in FIG. 5A, where the blur is compensated using OIS movement control with region-based blur reduction that is based at least in part on a ROI, in accordance with some embodiments. FIG. 5D shows a plot illustrating an example of a "blur over time" comparison, with respect to blur at the ROI, between the center point-based scheme implemented in FIG. 5B and the region-based scheme implemented in FIG. 5C. FIG. 5E shows a plot illustrating an example of blur over time, with respect to the center point of the image, when implementing the region-based scheme of FIG. 5C.

Figure 1:
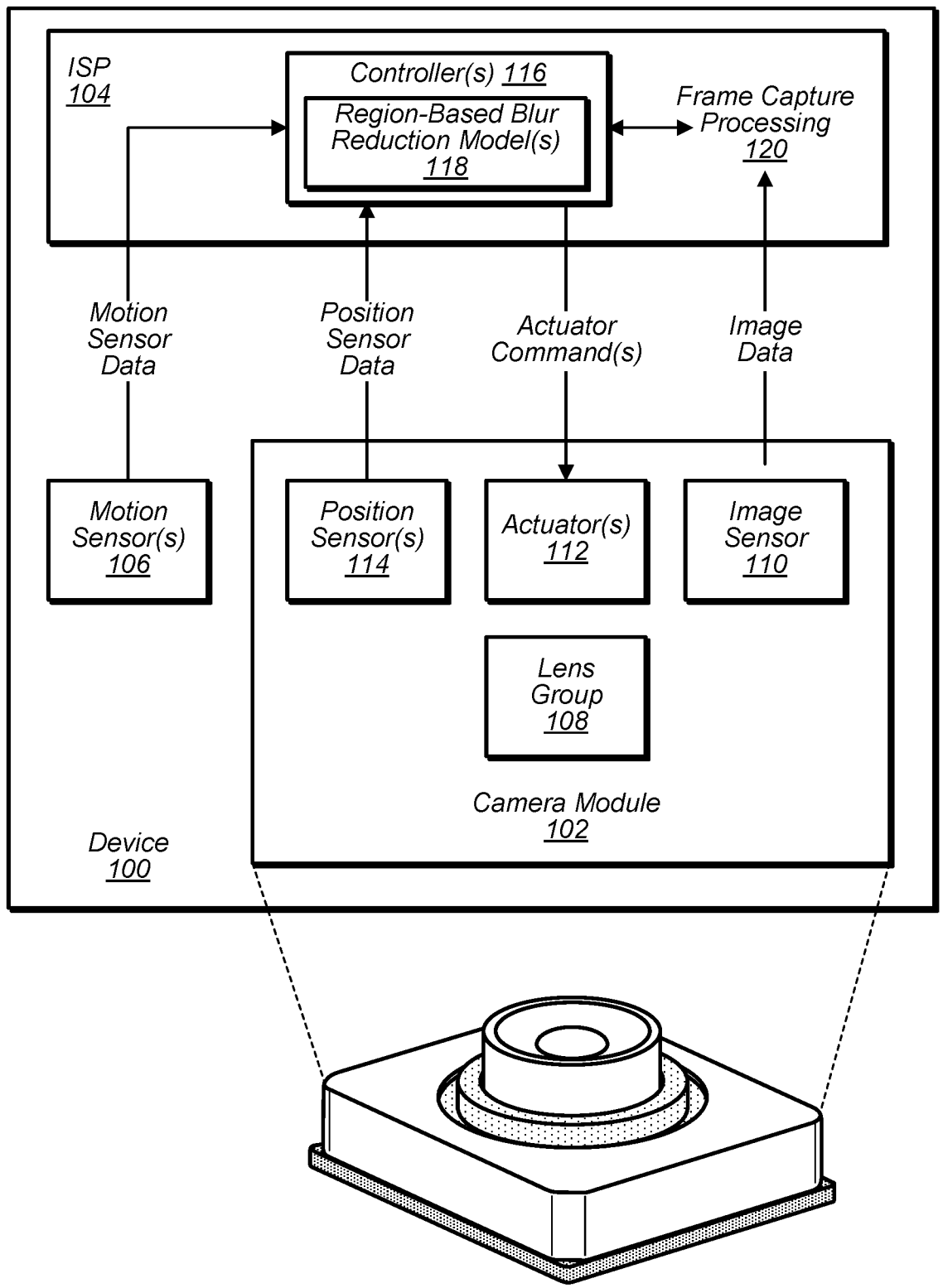
FIG. 1 illustrates a schematic block diagram of some components of an example device that includes a camera module and that may implement optical image stabilization (OIS) movement control with region-based blur reduction, in accordance with some embodiments. In various examples, such OIS movement control may be implemented according to a region-based blur reduction model, which may be designed, e.g., for blur reduction based at least in part on a target region of an image sensor.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to optical image stabilization (OIS) movement control with region-based blur reduction. According to various examples, such OIS movement control may be implemented for blur reduction that is based at least in part on a target region of an image sensor. In some embodiments, a region-based blur reduction model may be used to implement the OIS movement control. The region-based blur reduction model may be designed to minimize blur in the target region. As used herein, the term "region" refers to an area of multiple pixels of the image sensor. By contrast, the term "point" refers to a single pixel of the image sensor.

In some embodiments, a camera module may include an actuator for moving a lens group relative to an image sensor and/or for moving the image sensor relative to the lens group. For example, the actuator may move the lens group and/or the image sensor to focus (e.g., autofocus (AF)) the camera module with respect to an image and/or to stabilize the image (e.g., OIS). According to some non-limiting embodiments, a controller may be used to control the actuator so as to implement OIS movement control with region-based blur reduction during image capture. A target region of the image sensor (and/or of images captured via the image sensor) may be determined. For example, the target region may be a region at a default location (e.g., a central region) and/or a selected region of interest (ROI).

In some embodiments, a device comprising the camera module may include one or more motion sensors to obtain motion data associated with motion of the camera module and/or device. The camera module may include one or more position sensors to obtain position data associated with positioning of the lens group and/or the image sensor. The motion data and/or the position data may be used, e.g., as inputs to a region-based blur reduction model, to determine one or more OIS drive signals for implementing the OIS movement control according to the region-based blur reduction model. Furthermore, the controller may control the actuator to move (e.g., OIS movement) the lens group and/or the image sensor according to the OIS drive signals. In some embodiments, the actuator may provide OIS movement by moving the lens group and/or the image sensor in one or more directions orthogonal to an optical axis of the camera module.

Some other systems may be designed to compensate motion-induced blur at a center point of an image. The center point may be a point corresponding to a single pixel (e.g., a center pixel) of the image sensor. As compared to those systems, embodiments of the OIS movement control with region-based blur reduction disclosed herein may achieve a relatively larger blur reduction in a target region (which must include more than one pixel). In some non-limiting examples, achieving the relatively larger blur reduction in the target region may comprise a modest tradeoff in center blur. Those other systems designed for compensating motion-induced blur at the center point of the image may achieve a greater blur reduction at the center point compared to, e.g., embodiments of the OIS movement control with region-based blur reduction, but in various instances the difference in sharpness at the center may not be appreciable.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

As mentioned above, various embodiments include optical image stabilization (OIS) movement control with region-based blur reduction. FIG. 1 shows a schematic block diagram of some components of an example device that includes a camera module and that may implement such OIS movement control. As discussed in further detail herein, in various embodiments the device 100 may implement OIS movement control according to a region-based blur reduction model, which may be designed, e.g., for blur reduction based at least in part on a target region of an image sensor (and/or of images captured via the image sensor).

In some embodiments, the device 100 may include a camera module 102, an image signal processor (ISP) 104, and/or one or more motion sensors 106 (e.g., a gyroscope, an accelerometer, etc.). The camera module 102 may include a lens group 108, an image sensor 110, one or more actuators 112 (e.g., a voice coil motor (VCM) actuator) to move the lens group 108 and/or the image sensor 110, and/or one or more position sensors 114. The lens group 108 may include one or more lens elements. The image sensor 110 may be configured to capture light that has passed through the lens group 108. In some embodiments, the actuator(s) 112 may be configured to move the lens 108 and/or the image sensor 110 along an optical axis of the camera module 102 to provide zoom and/or focus (e.g., autofocus (AF)) functionality. In some embodiments, the optical axis may be defined by the lens group 108. According to some embodiments, the optical axis may be defined by the image sensor 110. Additionally, or alternatively, the actuator(s) 112 may be configured to move the lens group 108 and/or the image sensor 110 in one or more directions orthogonal to the optical axis, e.g., to provide OIS functionality.

In some examples, the ISP 104 may include a controller 116 that outputs actuator commands to control the actuator(s) 112 of the camera module 102. The term "controller" may be used herein to refer to one or more controllers and/or one or more processors. In some embodiments, some or all of the functionality of the controller 116 described herein may be performed by one or more other controllers and/or one or more other processors of the device 100 (and/or of the camera module 102).

In some embodiments, to provide OIS functionality, the controller 116 may receive as inputs motion sensor data (e.g., motion data associated with motion of the device 100 and/or the camera module 102) from the motion sensor(s) 106 and/or position sensor data (e.g., position data associated with OIS positioning of the lens group 108 and/or the image sensor 110) from the position sensor(s) 114. The controller 116 may use the motion sensor data and/or the position sensor data in determining OIS movement control of the actuator(s) 112 such that the lens group 108 and/or the image sensor 110 are moved to a suitable position to compensate for movement of the device 100 and stabilize image capture.

According to various embodiments, the controller 116 may include one or more region-based blur reduction models 118 configured to enable, at least in part, the OIS movement control with region-based blur reduction functionality described herein. For example, a region-based blur reduction model 118 may receive at least a portion of the motion sensor data and/or at least a portion of the position sensor data as inputs, and use the input(s) in determining blur reduction control decisions, calculating blur reduction control values, etc., as output(s). The controller 116 may use, at least in part, output(s) from the region-based blur reduction model 118 to determine one or more OIS drive signals (e.g., transmitted from the controller 116 to the actuator 112 via actuator commands) for controlling the actuator 112 to drive OIS movement of the lens group 108 and/or the image sensor 110.

In various embodiments, to provide zoom and/or focus functionality (e.g., AF), the controller 116 may receive as inputs frame capture data (e.g., associated with image frames generated for images captured via the camera module 102) and/or position sensor data (e.g., associated with focus positioning of the lens group 108 and/or the image sensor 110) from the position sensor(s). According to various embodiments, image data from the image sensor 110 may be provided as input to the ISP 104 for frame capture processing 120. The frame capture processing 120 may include generating image frames based at least in part on the image data received from the image sensor 110.

Some embodiments disclosed herein may be described as including a lens group being moved for implementation of OIS and/or AF in a camera module. It should be understood, however, that in various embodiments the OIS and/or AF movement may additionally, or alternatively, include an image sensor being moved via the actuator.

Figure 2:
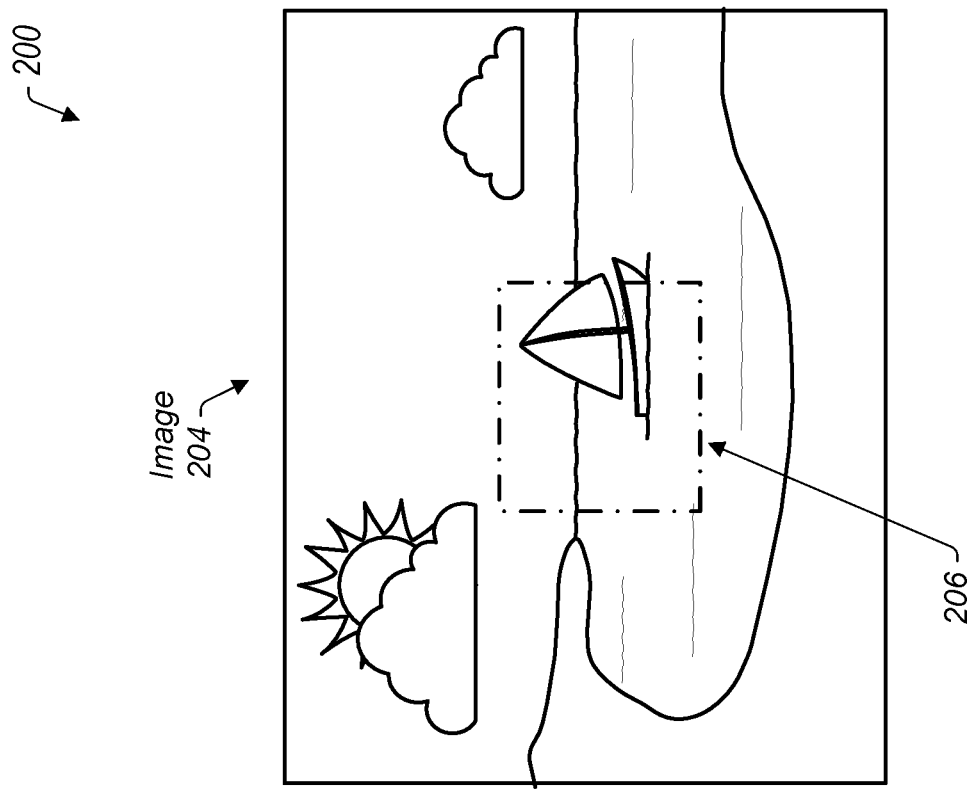
FIG. 2 illustrates a schematic diagram of an example image capture scenario that includes implementation of OIS movement control with region-based blur reduction that is based at least in part on a target region of an image sensor, in accordance with some embodiments.
Figure 2:
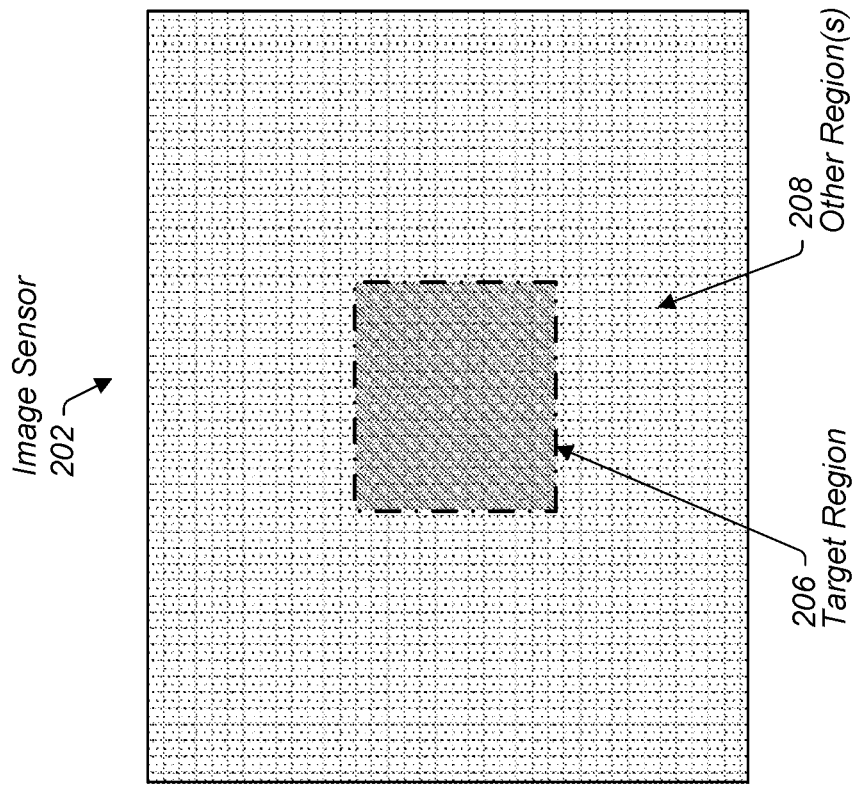

FIG. 2 shows a schematic diagram of an example image capture scenario 200 that includes implementation of OIS movement control with region-based blur reduction that is based at least in part on a target region of an image sensor. The image capture scenario 200 includes schematic representations of an example image sensor 202 and an example image 204. In this non-limiting example, a target region 206 may be a central region of the image sensor 202. In some cases, the target region 206 may surround and include a center point of the image sensor 202, e.g., as indicated in FIG. 2. The dashed box indicating the target region 206 of the image sensor 202 correspondingly indicates the target region 206 with respect to the image 204.

According to some embodiments, the target region 206 may be a "default" region of the image sensor 202. The target region 206 may be defined as having particular characteristics (e.g., size, shape, location, etc.) by default in some non-limiting examples. These default characteristics may be set, for example, by the manufacturer and/or by a user of a device (e.g., via one or more device settings available to the user). Image capture scenario 200 provides a non-limiting example default region (target region 206) that is centrally located and box-shaped, but one or more characteristics of target regions may be different in various embodiments. In some non-limiting examples, a target region may be a regular polygon or an irregular polygon. In some non-limiting examples, a target region may be circular, elliptical, and/or at least partially curved. According to some embodiments, the characteristics of the target region may be variable and may change from time to time. For example, a user may define the characteristics of a default region to be used as the target region via one or more software application settings and/or device settings. In some cases, the controller may determine the characteristics of the target region based at least in part on one or more metrics (e.g., associated with camera behavior, ambient information, etc.).

In some examples, the image sensor 202 may comprise multiple regions of pixels. For example, the regions of the image sensor 202 may include the target region 206 and one or more other regions 208. In FIG. 2, the target region 206 and the other region(s) 208 are respectively indicated with different types of hatching so as to indicate a difference in treatment of these regions when implementing OIS movement control with region-based blur reduction. In some examples, implementing OIS movement control with region-based blur reduction (e.g., during image capture of the image 204) may include controlling the actuator to move the lens group and/or the image sensor to minimize blur in the target region 206. According to some examples, implementing OIS movement control with region-based blur reduction may effect a greater reduction in blur associated with the target region 206 relative to one or more of the other region(s) 208.

Figure 4:
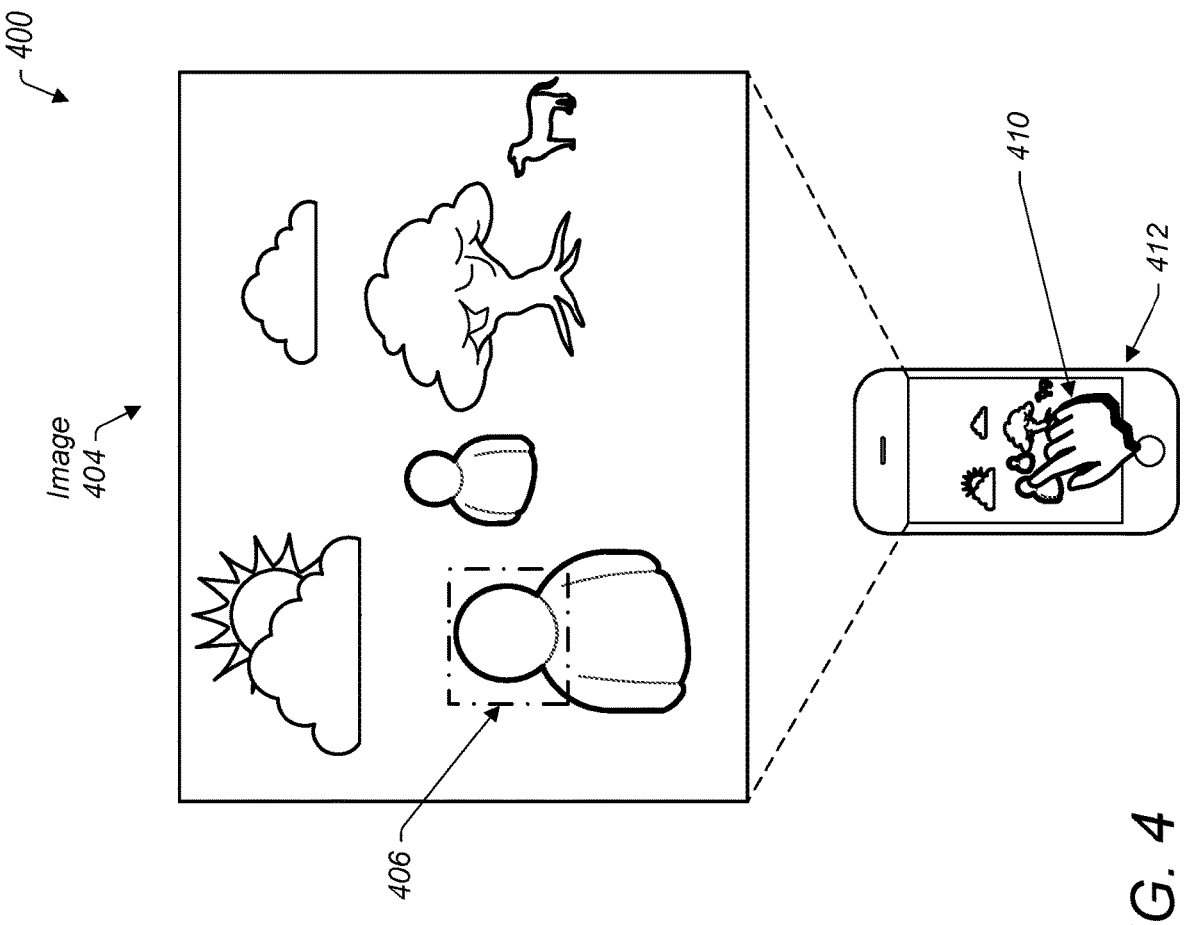
FIG. 4 illustrates a schematic diagram of an example image capture scenario that includes implementation of OIS movement control with region-based blur reduction that is based at least in part on a region of interest (ROI) of an image sensor, in accordance with some embodiments.
Figure 4:
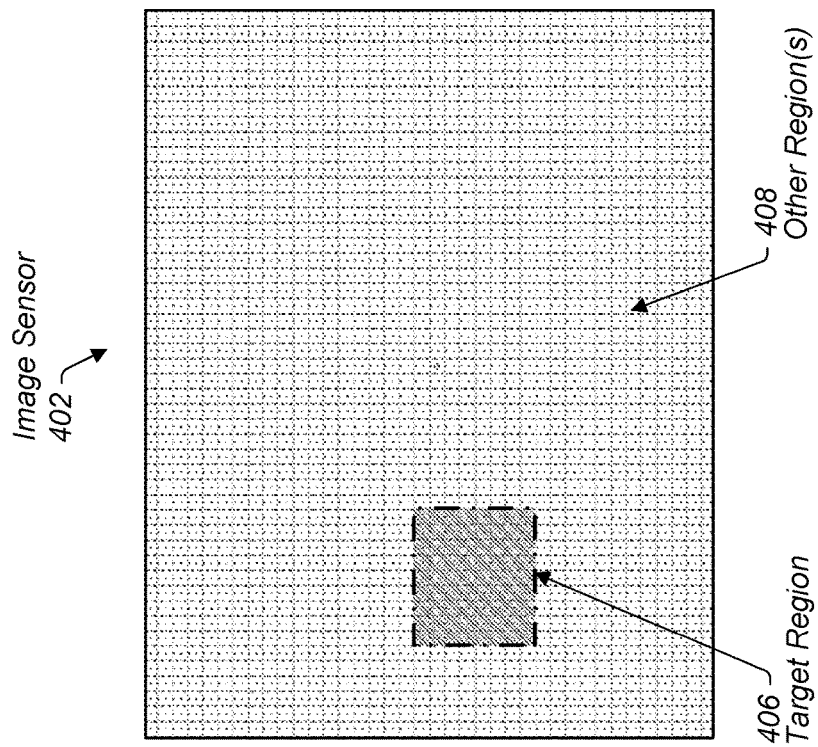

As discussed herein with reference to at least FIG. 4, the target region may comprise a region of interest (ROI) in various embodiments. FIG. 4 refers to a ROI that may be selectable, e.g., via a user selection and/or object detection (e.g., face detection). While referred to herein as a default region in the non-limiting example of image capture scenario 200, a target region that has default characteristics may also be considered a ROI in various embodiments.

Figure 3A:
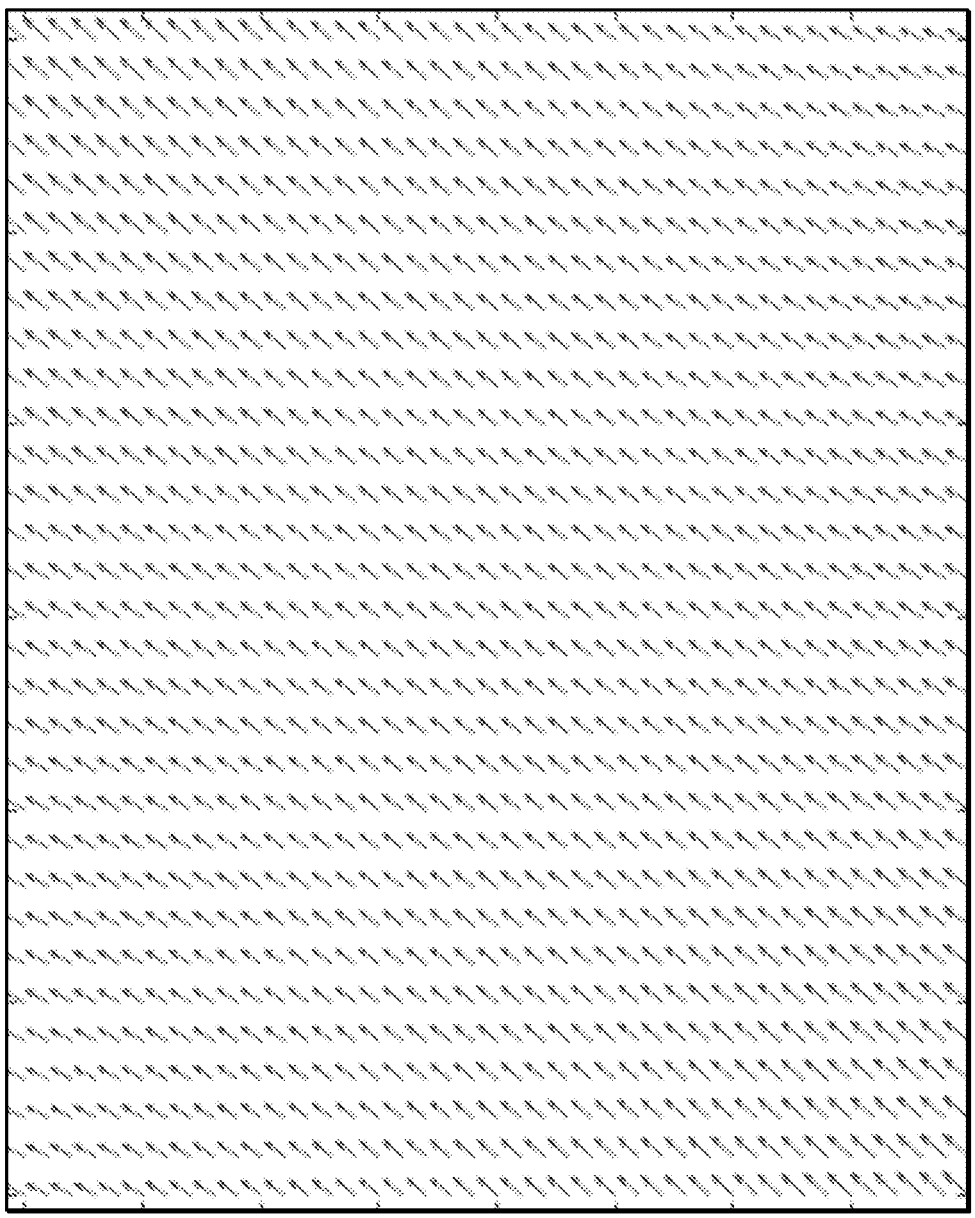
FIGS. 3A-3D show plots associated with examples of motion-induced blur and/or implementation of OIS for blur reduction.
Figure 3B:
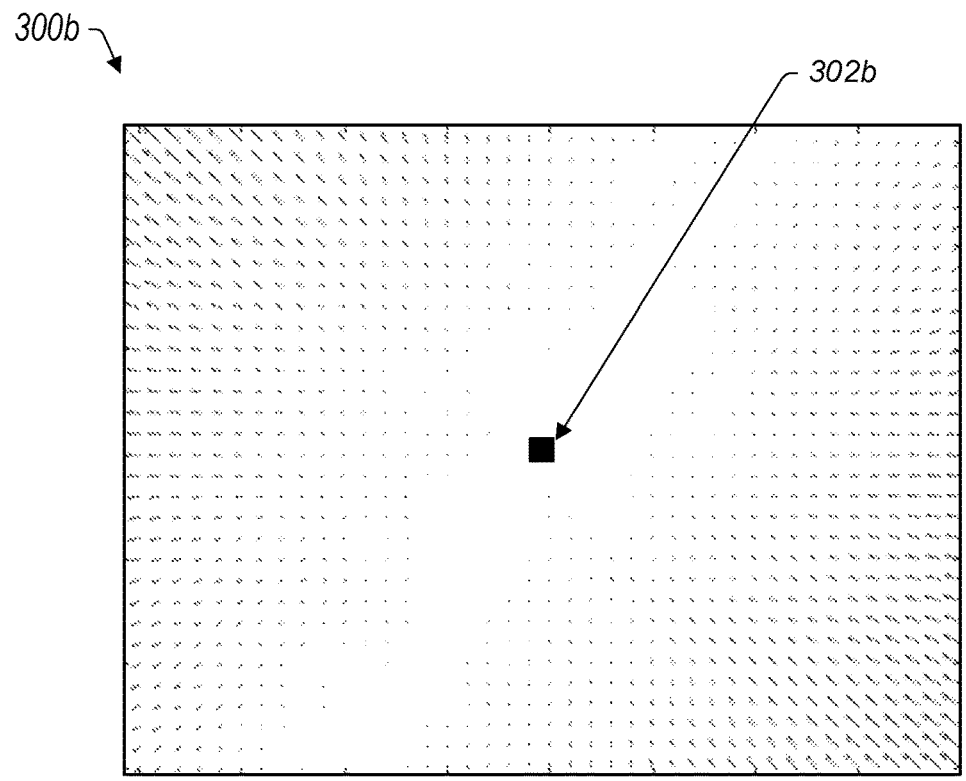
Figure 3C:
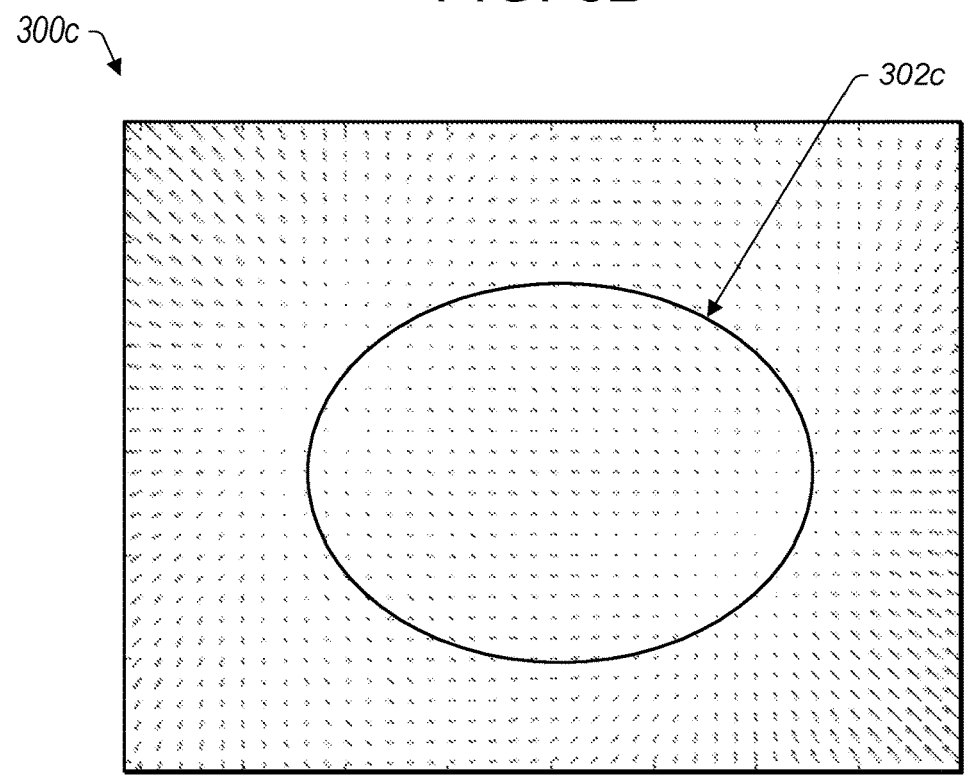
Figure 3D:
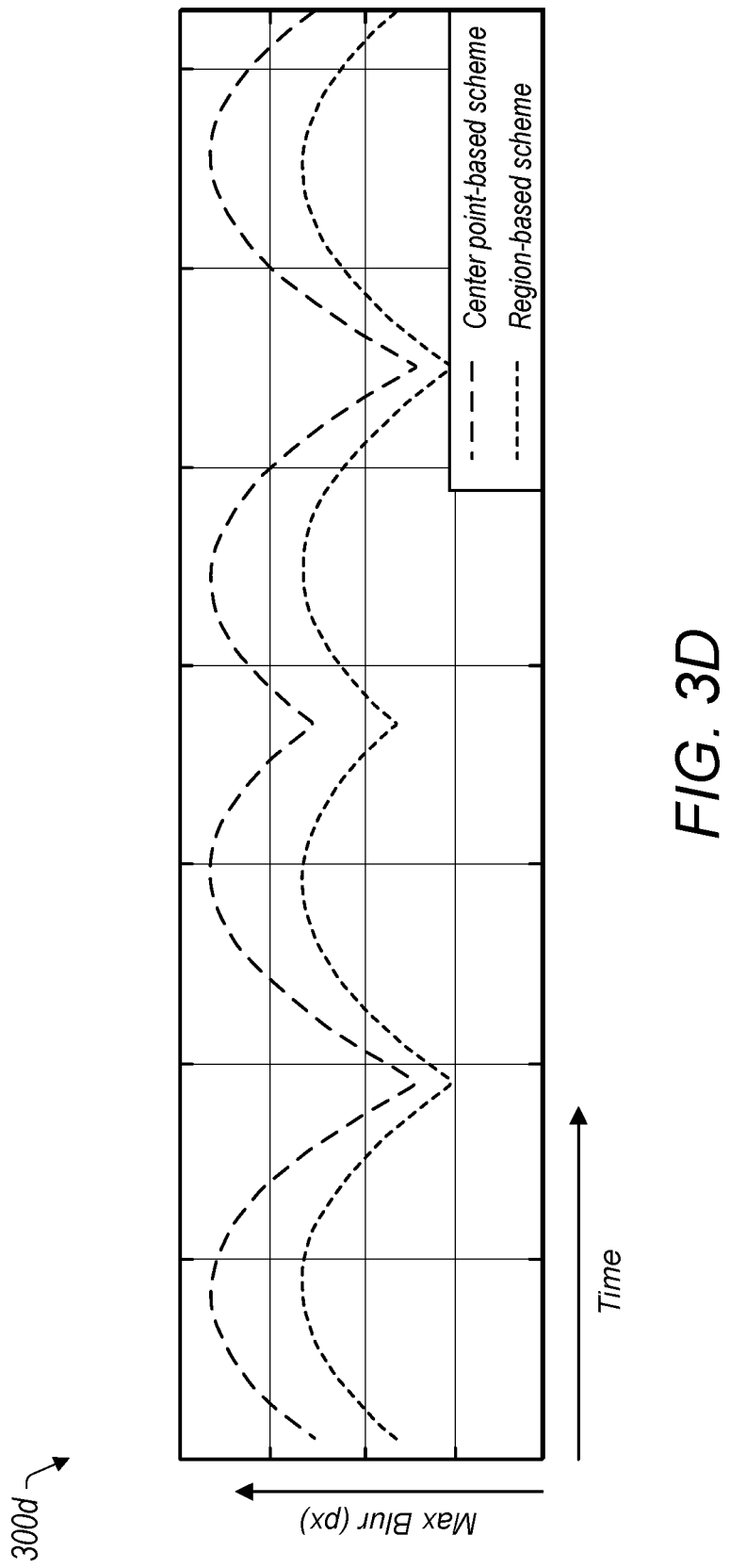

FIGS. 3A-3D show plots 300a-300d associated with examples of motion-induced blur and/or implementation of OIS for blur reduction. FIG. 3A shows a plot 300a illustrating an example of uncompensated blur resulting from motion (e.g., rotational motion) of a camera module (and/or a device comprising the camera module). The arrows in FIGS. 3A-3C are pixel motion vectors that indicate magnitude and direction of scene motion at respective pixels (e.g., resulting from rotational motion of the device) at a snapshot in time. The larger the magnitude of the scene motion in a region of pixels, the more blur will be present in that region. FIG. 3B shows a plot 300b illustrating an example of blur resulting from the motion indicated in FIG. 3A, where the blur is compensated via OIS that is designed to minimize blur at a center point 302b of an image (also referred to herein as a "center point-based scheme"). FIG. 3C shows a plot 300c illustrating an example of blur resulting from the motion indicated in FIG. 3A, where the blur is reduced using OIS movement control with region-based blur reduction (also referred to herein as a "region-based scheme"), in accordance with some embodiments. An example target region 302c is indicated in FIG. 3C. For example, the target region 302c may be a central region that surrounds and includes a center point (e.g., center point 302b in FIG. 3B). As indicated by FIGS. 3B-3C, in some embodiments the region-based scheme may include a tradeoff in center blur as compared to the center point-based scheme, but the region-based scheme may achieve a relatively larger reduction in blur in (and/or around) the target region 302c. In a center point-based scheme, the OIS control is designed to minimize the blur at the center point at all times. In a region-based scheme, the OIS control is designed to minimize the overall blur within the region (which may come at the cost of increased blur at the center of the image). In various embodiments, a region-based scheme may minimize the overall blur within the region by trying to obtain the lowest average blur (e.g., assuming all points within the region are treated as equal) and/or the lowest blur as determined by a function that applies different weights to different sub-regions of the ROI. FIG. 3D shows a plot 300d illustrating an example of a "blur over time" comparison between the center point-based scheme implemented in FIG. 3B and the region-based scheme implemented in FIG. 3C.

FIG. 4 shows a schematic diagram of an example image capture scenario 400 that includes implementation of OIS movement control with region-based blur reduction that is based at least in part on a ROI of an image sensor. The image capture scenario 400 includes schematic representations of an example image sensor 402 and an example image 404. In this non-limiting example, a target region 406 may be a ROI of the image sensor 402 (and/or of the image 404). The dashed box indicating the target region 406 of the image sensor 402 correspondingly indicates the target region 406 with respect to the image 404.

In some examples, the image sensor 402 may comprise multiple regions of pixels. For example, the regions of the image sensor 402 may include the target region 406 and one or more other regions 408. In FIG. 2, the target region 406 and the other region(s) 408 are respectively indicated with different types of hatching so as to indicate a difference in treatment of these regions when implementing OIS movement control with region-based blur reduction. In some examples, implementing OIS movement control with region-based blur reduction (e.g., during image capture of the image 404) may include controlling the actuator to move the lens group and/or the image sensor to minimize blur in the target region 406. According to some examples, implementing OIS movement control with region-based blur reduction may effect a greater reduction in blur associated with the target region 406 relative to one or more of the other region(s) 408.

According to some embodiments, the target region 206 may be a "selected" ROI that is determined, e.g., based at least in part on a user selection and/or via object detection (e.g., face detection). For example, FIG. 4 indicates a user selection 410 via a touchscreen display of a device 412. A preview (e.g., a live preview) of one or more images may be presented on the touchscreen display. In this non-limiting example, the user may touch a portion of the touchscreen display associated with a face of a person. For example, the user may tap the touchscreen display to select the face using a "tap-to-focus" feature associated with a camera module of the device 412. In some examples, the user may interact with the device 412 to designate a point of interest on the screen for the purpose of setting one or more camera parameters such as focus position, exposure, etc. The region selected for this process may become the ROI for the purpose of the OIS techniques described herein. In some embodiments, the device 412 may include object detection functionality designed to detect one or more types of objects, and the ROI (e.g., target region 406) may be selected based at least in part on a classification of one or more objects detected within a scene captured via the camera module. The object detection functionality may be used to assist in ROI selection from user interaction. Additionally, or alternatively, the object detection functionality may be used to set ROI in the absence of user interaction.

In some non-limiting embodiments, the target region 406 may be defined as having some default characteristics (e.g., size, shape, etc.). These default characteristics may be set, for example, by the manufacturer and/or by a user of a device (e.g., via one or more device settings available to the user). Image capture scenario 400 provides a non-limiting example of the target region 406 being box-shaped, but one or more characteristics of target regions may be different in various embodiments. In some non-limiting examples, a target region may be a regular polygon or an irregular polygon. In some non-limiting examples, a target region may be circular, elliptical, and/or at least partially curved. According to some embodiments, the characteristics of the target region may be variable and may change from time to time. For example, a user may define the characteristics of a default region to be used as the target region via one or more software application settings and/or device settings. In some cases, the controller may determine the characteristics of the target region based at least in part on one or more metrics (e.g., associated with camera behavior, ambient information, etc.).

Figure 5A:
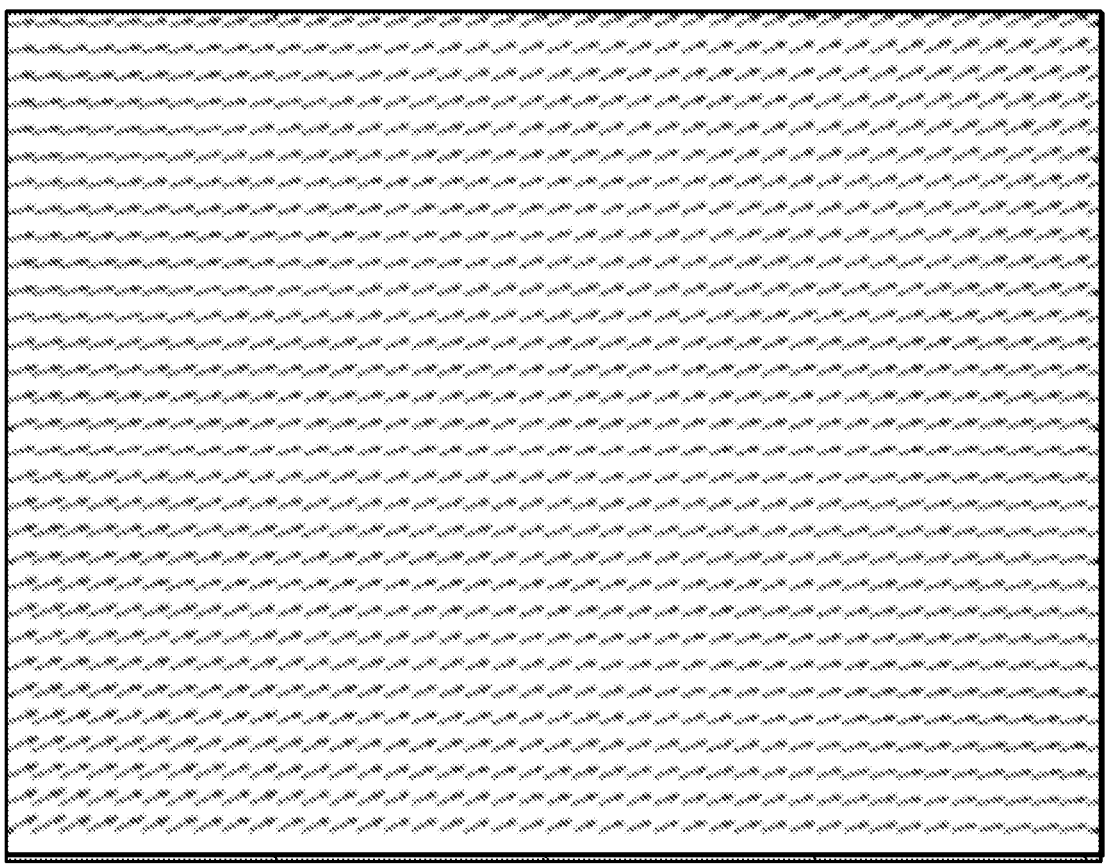
FIGS. 5A-5E show plots associated with examples of motion-induced blur and/or implementation of OIS for blur reduction.
Figure 5B:
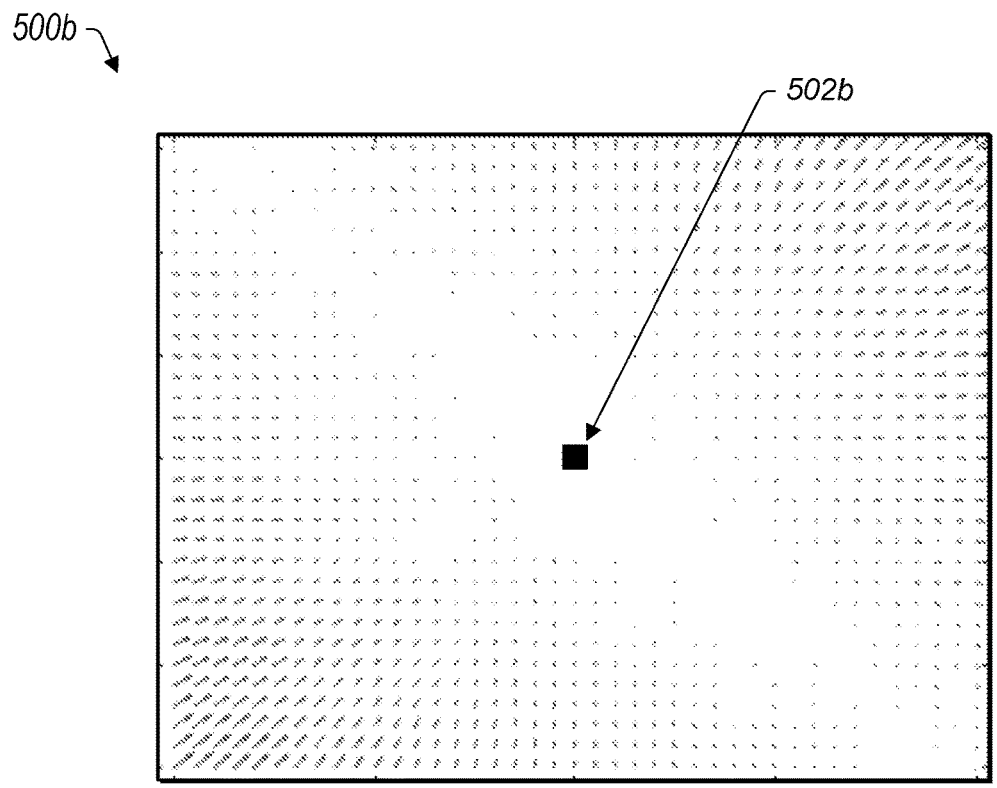
Figure 5C:
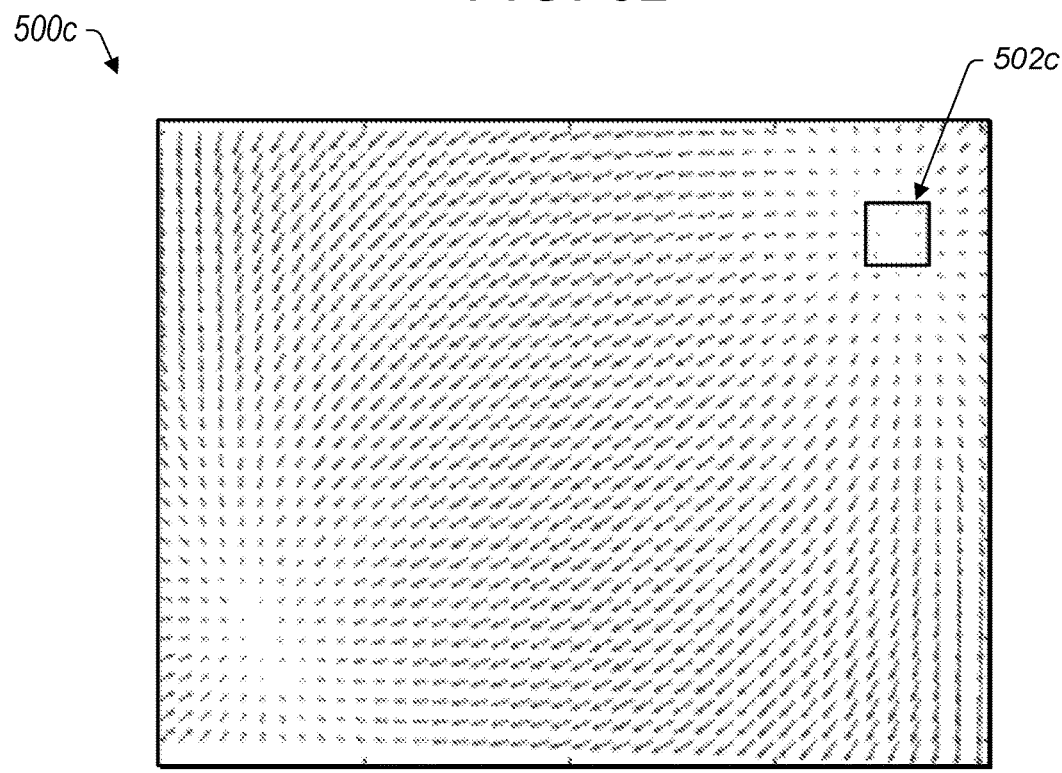
Figure 5D:
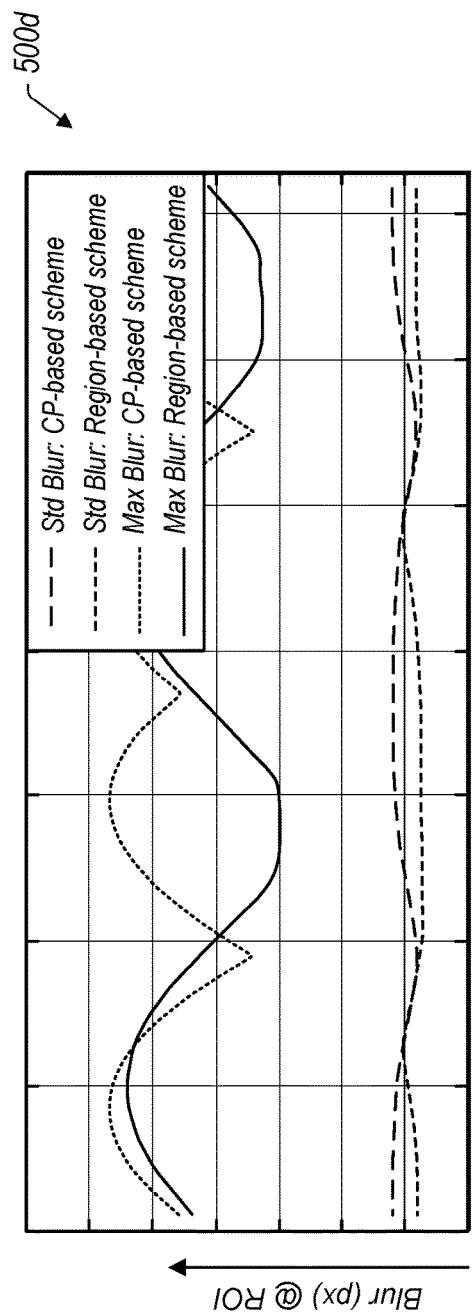
Figure 5E:
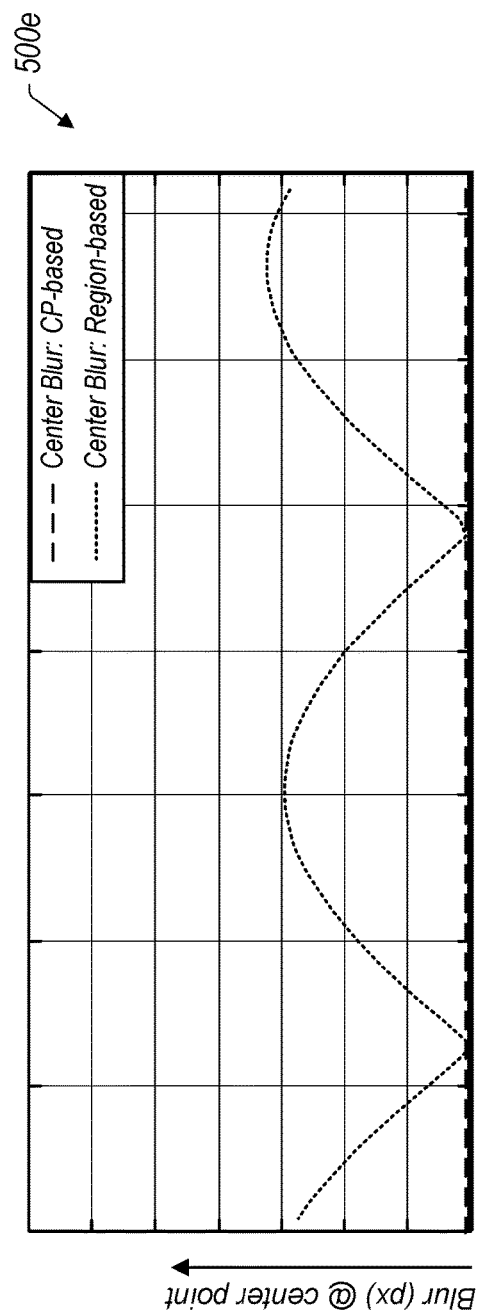

FIGS. 5A-5E show plots 500a-500e associated with examples of motion-induced blur and/or implementation of OIS for blur reduction. FIG. 5A shows a plot 500a illustrating an example of uncompensated blur resulting from motion (e.g., rotational motion) of a camera module (and/or a device comprising the camera module). The arrows in FIGS. 5A-5C are pixel motion vectors that indicate magnitude and direction of motion of respective pixels (e.g., resulting from rotational motion of the device) at a snapshot in time. FIG. 5B shows a plot 500b illustrating an example of blur resulting from the motion indicated in FIG. 5A, where the blur is compensated via OIS that is designed to minimize blur at a center point 502b of an image. FIG. 5C shows a plot 500c illustrating an example of blur resulting from the motion indicated in FIG. 5A, where the blur is reduced using OIS movement control with region-based blur reduction that is based at least in part on a target region (e.g., ROI 502c) of an image sensor. As indicated in plot 500c, the ROI 502c is not centered on the scene in this example. FIG. 5D shows a plot 500d illustrating an example of a "blur over time" comparison, with respect to blur at the ROI, between the center point-based scheme implemented in FIG. 5B and the region-based scheme implemented in FIG. 5C. FIG. 5E shows a plot 500e illustrating an example of a "blur over time" comparison, with respect to blur at the center point of the image, between the center point-based scheme implemented in FIG. 5B and the region-based scheme implemented in FIG. 5C.

Figure 6:
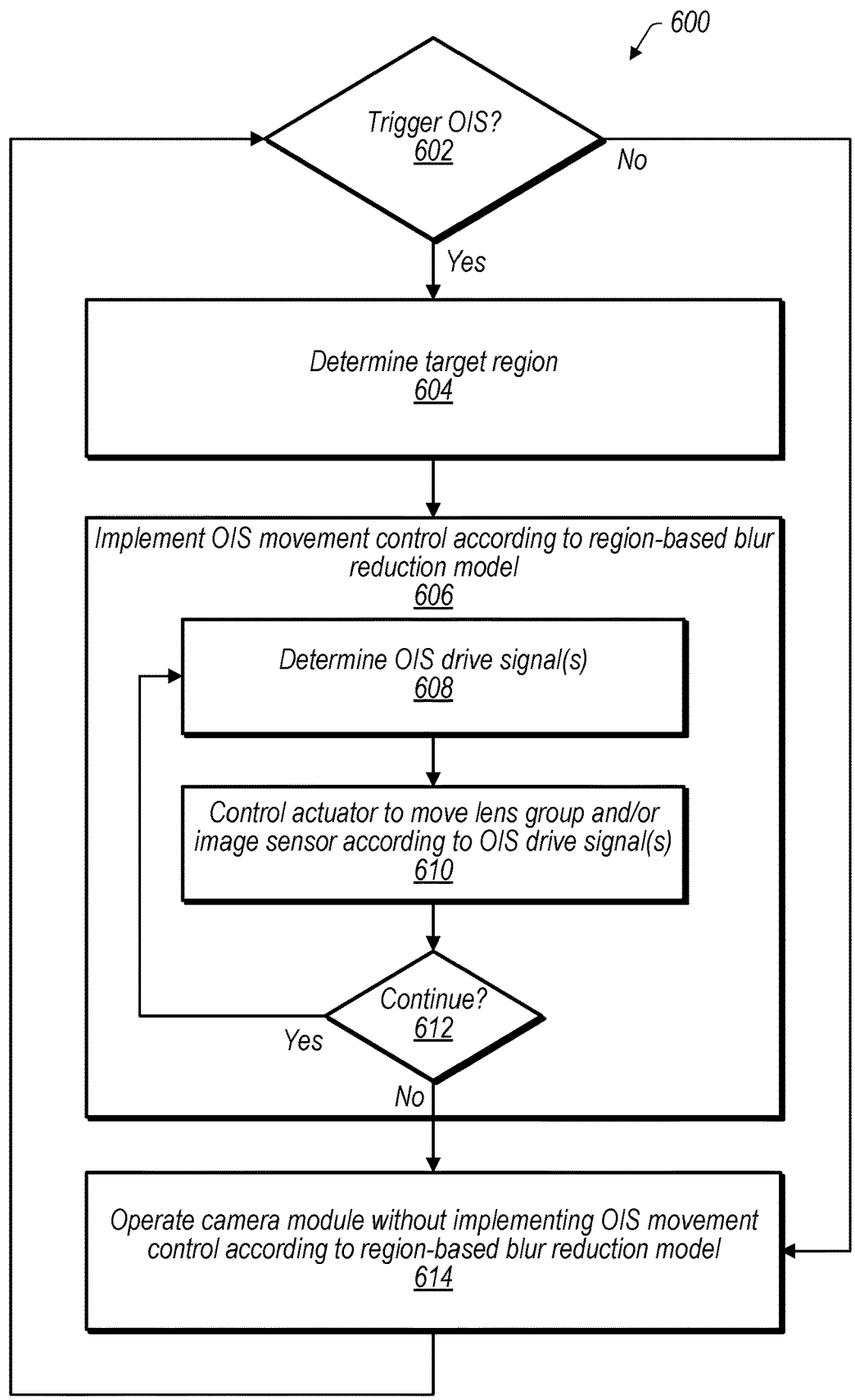
FIG. 6 is a flowchart of an example method of implementing OIS movement control with region-based blur reduction, in accordance with some embodiments.

FIG. 6 is a flowchart of an example method 600 of implementing OIS movement control with region-based blur reduction. At 602, the method 600 may include determining whether OIS movement control with region-based blur reduction is triggered. For example, a determination may be made that the OIS movement control should be implemented during image capture in response to detected motion, e.g., to compensate and/or reduce motion-induced blur in the image.

If it is determined, at 602, that OIS movement control with region-based blur reduction is triggered, then the method 600 may include determining a target region, at 604. In some embodiments, the target region may be a default and/or a central region of the image sensor, e.g., as discussed herein with reference to at least FIG. 2. In some embodiments, the target region may be a selected ROI of the image sensor, e.g., based on user selection and/or object detection as discussed herein with reference to at least FIG. 4. According to various examples, the target region may comprise an area associated with multiple pixels of the image sensor. Furthermore, the target region may comprise a region of multiple regions of the image sensor. For example, the image sensor may comprise the target region and one or more remainder regions. The regions may be different subsets of the image sensor. In some non-limiting examples, the image sensor may comprise multiple predefined regions, and the target region may be selected from among those predefined regions. For instance, the target region may be selected based at least in part on a determination of which region among the predefined regions encompasses (and/or best corresponds to) an area of a user selection (e.g., via a tap-to-focus feature in which a user taps a touchscreen to select a particular location of an image preview) or an area of an object detection.

At 606, the method 600 may include implementing OIS movement control with region-based blur reduction, e.g., according to a region-based blur reduction model. According to various embodiments, the region-based blur reduction model may effect a greater reduction in blur associated with the target region relative to one or more other regions of the image sensor. In some embodiments, the region-based blur reduction model may be configured such that implementation of the OIS movement control with region-based blur reduction minimizes blur in the target region. In some embodiments, implementing OIS movement control with region-based blur reduction may include determining one or more OIS drive signals for implementing the OIS movement control according to a region-based blur reduction model, at 608. Furthermore, implementing OIS movement control with region-based blur reduction may include controlling the actuator to move the lens group and/or the image sensor according to the OIS drive signal(s), at 610.

As previously discussed, a device comprising the camera module may include one or more motion sensors to obtain motion data associated with motion of the camera module and/or the device. Furthermore, the camera module may include one or more position sensors to obtain position data associated with positioning of the lens group and/or the image sensor. In some embodiments, determining the OIS drive signal(s), at 608, may include inputting, into the region-based blur reduction model, at least a portion of the motion data and/or at least a portion of the position data. The region-based blur reduction model may be configured to produce an output based at least in part on the input(s). An output from the region-based blur reduction model may itself be a determination with respect to the OIS drive signal(s). Additionally, or alternatively, the OIS drive signal(s) may be determined based at least in part on an output from the region-based blur reduction model in some embodiments.

At 612, the method 600 may include determining whether to continue implementing the OIS movement control according to the region-based blur reduction model. If it is determined, at 612, to continue implementing the OIS movement control, then the method 600 may include continuing to determine OIS drive signal(s), at 608. If it is determined, at 612, not to continue implementing the OIS movement control, then the method 600 may include operating the camera module without implementing the OIS movement control according to the region-based blur reduction model, at 614. Similarly, referring back to 602, if it is determined that OIS movement control with region-based blur reduction is not triggered, then the method 600 may include operating the camera module without implementing the OIS movement control, at 614. While operating the camera module without implementing the OIS movement control, the method 600 may continue to evaluate whether the OIS movement control is triggered, at 602.

The following discussion includes some non-limiting examples of equations that, in some cases, may be used (e.g., by the controller 116 and/or as part of the region-based blur reduction model 118 in FIG. 1) in implementing OIS movement control. In various examples, light associated with an object in a scene may pass through a lens and be projected onto an image sensor. The object may have a position characterized as (x, y, d), with "d" denoting object distance. The lens may have a position characterized as (0, 0, 0). The projection of the object may have a position on the image sensor that is characterized as (x', y'). Furthermore, in the following equations, "fp" denotes practical focal length (PFL), and "f" denotes effective focal length (EFL).

$$\frac{1}{f} = \frac{1}{f_p} + \frac{1}{d} \Rightarrow f_p = \frac{f}{1 - \frac{f}{d}}$$

$$\begin{bmatrix} x \\ y \end{bmatrix} = \begin{bmatrix} -d\frac{x'}{f_p} \\ -d\frac{y'}{f_p} \end{bmatrix}$$

$$\begin{bmatrix} x' \\ y' \end{bmatrix} = \begin{bmatrix} -f_p\frac{x}{d} \\ -f_p\frac{y}{d} \end{bmatrix}$$

As indicated above, the object's projection position (x', y') on the image sensor is related to the object position. In OIS, an objective may be to keep the objected projected to the same location on the image sensor. To that end, the lens and/or the image sensor may be shifted to compensate for rotational and/or translational camera motion (e.g., due to hand motion). In some instances, the impact of translational motion may be considered negligible for objects at infinity. However, in various examples, rotational and translational effects at macro may be non-negligible.

As previously noted, OIS movement (e.g., of the lens and/or the image sensor) may be controlled so as to keep the projection of the rotated object to the same location on the image sensor (e.g., so as to mitigate the impact of rotational and/or translational motion with respect to the location of the projection on the image sensor). For example, a positional shift (e.g., for OIS) of the lens may be characterized as (Δx, Δy, 0).

In some non-limiting examples, the following may be used to characterize the positional shift of the lens when implementing center point-based OIS for minimizing blur at a center point of an image:

$$\begin{bmatrix} \Delta x \\ \Delta y \end{bmatrix}_{lens|(0,0)} \approx \begin{bmatrix} 0 \\ \left(\frac{f_p \sin\theta}{\cos\theta + \frac{f_p}{d}}\right) \end{bmatrix}$$

When the object is at infinity, the following may be used to characterize the positional shift of the lens when implementing center point-based OIS:

$$\begin{bmatrix} \Delta x \\ \Delta y \end{bmatrix}_{lens|(0,0)} \approx \begin{bmatrix} 0 \\ (f_p \tan\theta) \end{bmatrix}$$

In some non-limiting examples, the following may be used to characterize the positional shift of the lens when implementing region-based OIS for minimizing blur at a target region (e.g., a ROI):

$$\begin{bmatrix} \Delta x \\ \Delta y \end{bmatrix}_{lens|(x',y')} \approx \begin{bmatrix} -\left(\frac{1 - \cos\theta}{\cos\theta + \frac{f_p}{d}}\right)x' \\ \left(\frac{f_p \sin\theta}{\cos\theta + \frac{f_p}{d}}\right)\left(1 + \left(\frac{y'}{f_p}\right)^2\right) \end{bmatrix}$$

Figure 7:
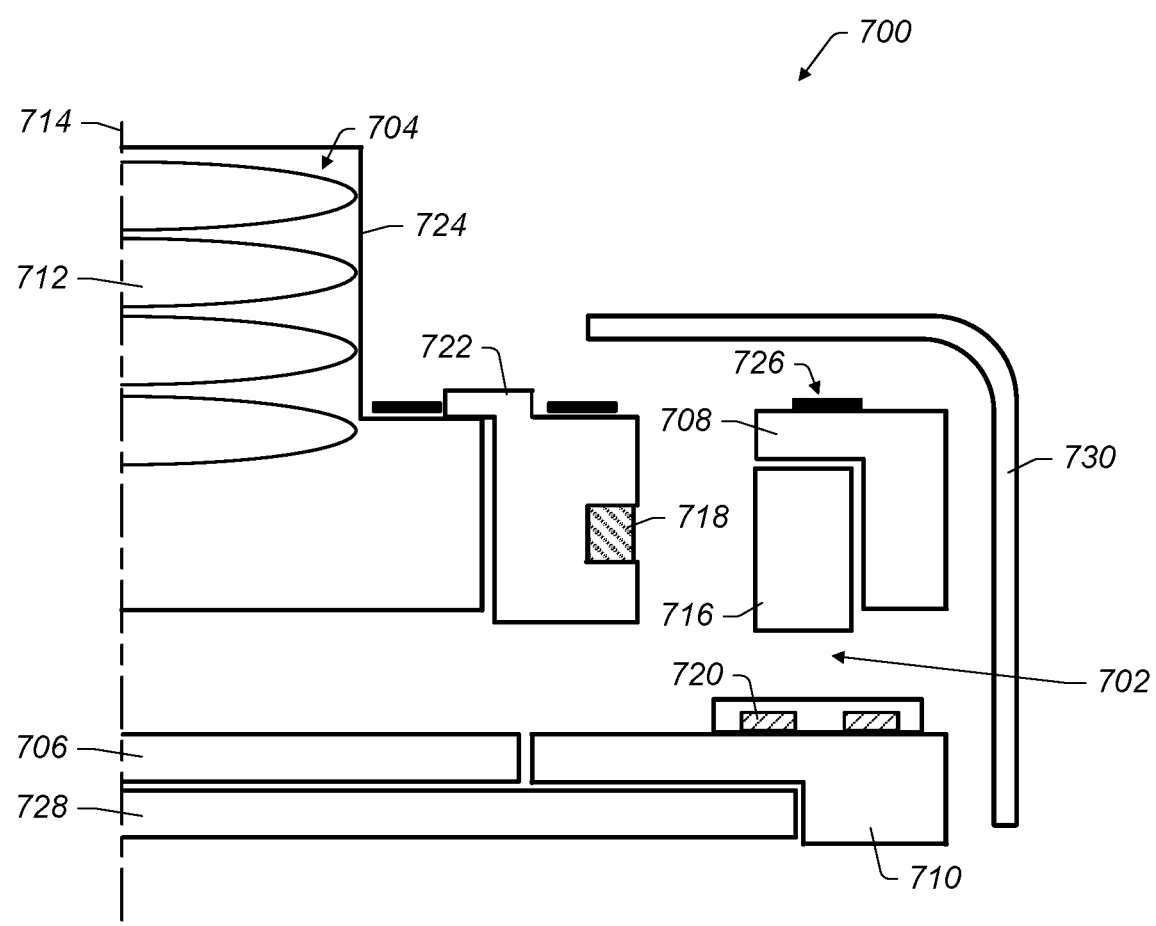
FIG. 7 illustrates a side cross-sectional view of an example camera module that includes an actuator that may be used to implement OIS movement control with region-based blur reduction, in accordance with some embodiments.

FIG. 7 illustrates a side cross-sectional view of an example camera module 700 that includes an actuator 702 that may be used to implement OIS movement control with region-based blur reduction According to various embodiments, the camera module 700 may include a lens group 704, an image sensor 706, the actuator 702, a magnet holder 708, and/or a base structure 710. The lens group 704 may include one or more lens elements 712 that define an optical axis 714. The image sensor 706 may be configured to capture light that passes through the lens group 704.

In some embodiments, the actuator 702 may be configured to move the lens group 704 and/or the image sensor 706, e.g., causing relative movement between the lens group 704 and the image sensor 706 to provide autofocus (AF) and/or OIS functionality. For example, the actuator 702 may move the lens group 704 along the optical axis 714 to provide AF of an image on the image sensor 706. Additionally, or alternatively, the actuator 702 may move the lens group 704 in one or more directions orthogonal to the optical axis 714 to provide OIS of an image on the image sensor 706.

In some embodiments, the actuator 702 may comprise one or more voice coil motor (VCM) actuators. For example, the actuator 702 may include one or more magnets 716 and one or more coils (e.g., AF coil(s) 718 and/or OIS coil(s) 720). In some embodiments, the magnet(s) 716 may be attached to the magnet holder 708.

According to some non-limiting embodiments, the AF coil(s) 718 may be attached to a lens carrier 722 and/or a lens barrel 724. The lens carrier 722 may be coupled with the lens barrel 724 in some embodiments. In some embodiments, the lens barrel 724 may hold the lens element(s) 712 of the lens group 704. The AF coil(s) 718 may be disposed proximate the magnet(s) 716 such that the AF coil(s) 718 and the magnet(s) 716 magnetically interact when a current is provided to the AF coil(s) 718 In various embodiments, the magnetic interaction produces a Lorentz force that causes the lens group 704 (e.g., via the lens carrier 722 and/or the lens barrel 724) to move along the optical axis 714 to provide AF functionality.

According to some embodiments, the OIS coil(s) 720 may be coupled with the base structure 710. The OIS coil(s) 720 may be disposed proximate the magnet(s) 716 such that the OIS coil(s) 720 and the magnet(s) 716 magnetically interact when a current is provided to the OIS coil(s) 720. In various embodiments, the magnetic interaction produces a Lorentz force that causes the lens group 704 (e.g., via the magnet holder 708, the lens carrier 722, and/or the lens barrel 724) to move in one or more directions orthogonal to the optical axis 714 to provide OIS functionality.

In various examples, the camera 400 may include one or more suspension arrangements. For example, the camera 400 may include one or more leaf springs 726 in some embodiments. In some embodiments, the leaf spring(s) 726 may be used to suspend the lens carrier 722 from the magnet holder 708.

In some embodiments, the image sensor 706 may be coupled to the base structure 710. As a non-limiting example, the image sensor 706 may be attached to a substrate 728, and the substrate 728 may be attached to the base structure 710. In various embodiments, the image sensor 706, the substrate 728, and/or the base structure 710 may be stationary relative to movement of the lens group 704, the lens barrel 724, the lens carrier 726, and/or the magnet holder 708. Additionally, or alternatively, a stationary structure such as a shield can 730 may encase at least a portion of the camera 700.

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 8:
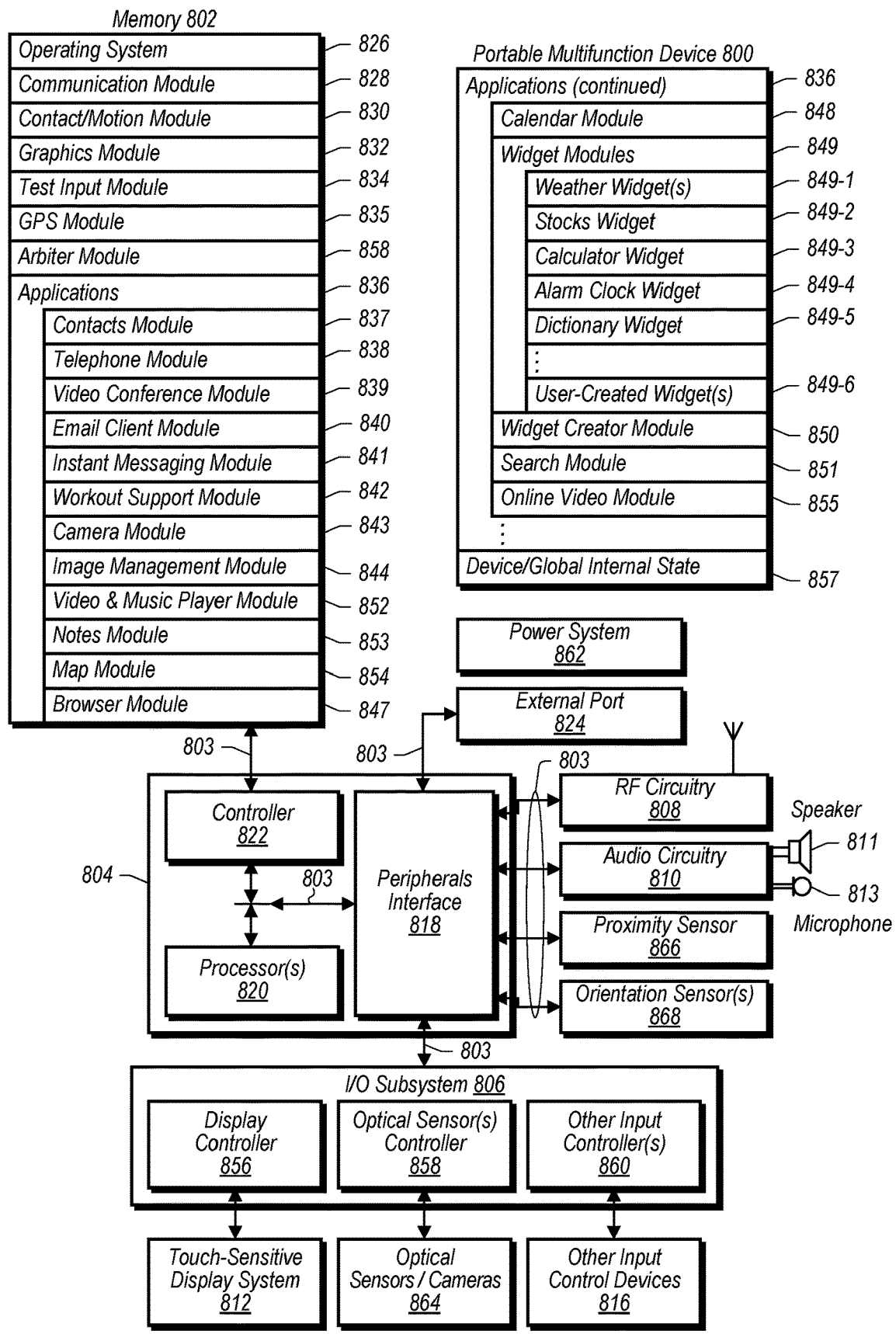
FIG. 8 illustrates a block diagram of a portable multifunction device that may include a camera module and that may implement OIS movement control with region-based blur reduction, in accordance with some embodiments.

Attention is now directed toward embodiments of portable devices with cameras. FIG. 8 illustrates a block diagram of an example portable multifunction device 800 that may include a camera module and that may implement OIS movement control with region-based blur reduction (e.g., as described above with reference to FIGS. 1-7), according to some embodiments. Cameras 864 are sometimes called "optical sensors" for convenience, and may also be known as or called an optical sensor system. Device 800 may include memory 802 (which may include one or more computer readable storage mediums), memory controller 822, one or more processing units (CPUs) 820, peripherals interface 818, RF circuitry 808, audio circuitry 810, speaker 811, touch-sensitive display system 812, microphone 813, input/output (I/O) subsystem 806, other input or control devices 816, and external port 824. Device 800 may include multiple optical sensors 864. These components may communicate over one or more communication buses or signal lines 803.

It should be appreciated that device 800 is only one example of a portable multifunction device, and that device 800 may have more or fewer components than shown, may combine two or more components, or may have a different configuration or arrangement of the components. The various components shown in FIG. 8 may be implemented in hardware, software, or a combination of hardware and software, including one or more signal processing and/or application specific integrated circuits.

Memory 802 may include high-speed random access memory and may also include non-volatile memory, such as one or more magnetic disk storage devices, flash memory devices, or other non-volatile solid-state memory devices. Access to memory 802 by other components of device 800, such as CPU 820 and the peripherals interface 818, may be controlled by memory controller 822.

Peripherals interface 818 can be used to couple input and output peripherals of the device to CPU 820 and memory 802. The one or more processors 820 run or execute various software programs and/or sets of instructions stored in memory 802 to perform various functions for device 800 and to process data.

In some embodiments, peripherals interface 818, CPU 820, and memory controller 822 may be implemented on a single chip, such as chip 804. In some other embodiments, they may be implemented on separate chips.

RF (radio frequency) circuitry 808 receives and sends RF signals, also called electromagnetic signals. RF circuitry 808 converts electrical signals to/from electromagnetic signals and communicates with communications networks and other communications devices via the electromagnetic signals. RF circuitry 808 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 808 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 810, speaker 811, and microphone 813 provide an audio interface between a user and device 800. Audio circuitry 810 receives audio data from peripherals interface 818, converts the audio data to an electrical signal, and transmits the electrical signal to speaker 811. Speaker 811 converts the electrical signal to human-audible sound waves. Audio circuitry 810 also receives electrical signals converted by microphone 813 from sound waves. Audio circuitry 810 converts the electrical signal to audio data and transmits the audio data to peripherals interface 818 for processing. Audio data may be retrieved from and/or transmitted to memory 802 and/or RF circuitry 808 by peripherals interface 818. In some embodiments, audio circuitry 810 also includes a headset jack (e.g., 912, FIG. 9). The headset jack provides an interface between audio circuitry 810 and removable audio input/output peripherals, such as output-only headphones or a headset with both output (e.g., a headphone for one or both ears) and input (e.g., a microphone).

I/O subsystem 806 couples input/output peripherals on device 800, such as touch screen 812 and other input control devices 816, to peripherals interface 818. I/O subsystem 806 may include display controller 856 and one or more input controllers 860 for other input or control devices. The one or more input controllers 860 receive/send electrical signals from/to other input or control devices 816. The other input control devices 816 may include physical buttons (e.g., push buttons, rocker buttons, etc.), dials, slider switches, joysticks, click wheels, and so forth. In some alternate embodiments, input controller(s) 860 may be coupled to any (or none) of the following: a keyboard, infrared port, USB port, and a pointer device such as a mouse. The one or more buttons (e.g., 908, FIG. 9) may include an up/down button for volume control of speaker 811 and/or microphone 813. The one or more buttons may include a push button (e.g., 906, FIG. 9).

Touch-sensitive display 812 provides an input interface and an output interface between the device and a user. Display controller 856 receives and/or sends electrical signals from/to touch screen 812. Touch screen 812 displays visual output to the user. The visual output may include graphics, text, icons, video, and any combination thereof (collectively termed "graphics"). In some embodiments, some or all of the visual output may correspond to user-interface objects.

Touch screen 812 has a touch-sensitive surface, sensor or set of sensors that accepts input from the user based on haptic and/or tactile contact. Touch screen 812 and display controller 856 (along with any associated modules and/or sets of instructions in memory 802) detect contact (and any movement or breaking of the contact) on touch screen 812 and converts the detected contact into interaction with user-interface objects (e.g., one or more soft keys, icons, web pages or images) that are displayed on touch screen 812. In an example embodiment, a point of contact between touch screen 812 and the user corresponds to a finger of the user.

Touch screen 812 may use LCD (liquid crystal display) technology, LPD (light emitting polymer display) technology, or LED (light emitting diode) technology, although other display technologies may be used in other embodiments. Touch screen 812 and display controller 856 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 812. In an example embodiment, projected mutual capacitance sensing technology is used, such as that found in the iPhone®, iPod Touch®, and iPad® from Apple Inc. of Cupertino, California.

Touch screen 812 may have a video resolution in excess of 800 dpi. In some embodiments, the touch screen has a video resolution of approximately 860 dpi. The user may make contact with touch screen 812 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 800 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 812 or an extension of the touch-sensitive surface formed by the touch screen.

Device 800 also includes power system 862 for powering the various components. Power system 862 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 800 may also include one or more optical sensors or cameras 864. FIG. 8 shows an optical sensor 864 coupled to optical sensor controller 858 in I/O subsystem 806. Optical sensor 864 may include charge-coupled device (CCD) or complementary metal-oxide semiconductor (CMOS) phototransistors. Optical sensor 864 receives light from the environment, projected through one or more lens, and converts the light to data representing an image. In conjunction with imaging module 843 (also called a camera module), optical sensor 864 may capture still images or video. In some embodiments, an optical sensor 864 is located on the back of device 800, opposite touch screen display 812 on the front of the device, so that the touch screen display 812 may be used as a viewfinder for still and/or video image acquisition. In some embodiments, another optical sensor is located on the front of the device so that the user's image may be obtained for videoconferencing while the user views the other video conference participants on the touch screen display.

Device 800 may also include one or more proximity sensors 866. FIG. 8 shows proximity sensor 866 coupled to peripherals interface 818. Alternately, proximity sensor 866 may be coupled to input controller 860 in I/O subsystem 806. In some embodiments, the proximity sensor 866 turns off and disables touch screen 812 when the multifunction device 800 is placed near the user's ear (e.g., when the user is making a phone call).

Device 800 includes one or more orientation sensors 868. In some embodiments, the one or more orientation sensors 868 include one or more accelerometers (e.g., one or more linear accelerometers and/or one or more rotational accelerometers). In some embodiments, the one or more orientation sensors 868 include one or more gyroscopes. In some embodiments, the one or more orientation sensors 868 include one or more magnetometers. In some embodiments, the one or more orientation sensors 868 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 800. In some embodiments, the one or more orientation sensors 868 include any combination of orientation/rotation sensors. FIG. 8 shows the one or more orientation sensors 868 coupled to peripherals interface 818. Alternately, the one or more orientation sensors 868 may be coupled to an input controller 860 in I/O subsystem 806. In some embodiments, information is displayed on the touch screen display 812 in a portrait view or a landscape view based on an analysis of data received from the one or more orientation sensors 868.

In some embodiments, the software components stored in memory 802 include operating system 826, communication module (or set of instructions) 828, contact/motion module (or set of instructions) 830, graphics module (or set of instructions) 832, text input module (or set of instructions) 834, Global Positioning System (GPS) module (or set of instructions) 835, arbiter module 858 and applications (or sets of instructions) 836. Furthermore, in some embodiments memory 802 stores device/global internal state 857. Device/global internal state 857 includes one or more of: active application state, indicating which applications, if any, are currently active; display state, indicating what applications, views or other information occupy various regions of touch screen display 812; sensor state, including information obtained from the device's various sensors and input control devices 816; and location information concerning the device's location and/or attitude.

Operating system 826 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 828 facilitates communication with other devices over one or more external ports 824 and also includes various software components for handling data received by RF circuitry 808 and/or external port 824. External port 824 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 830 may detect contact with touch screen 812 (in conjunction with display controller 856) and other touch sensitive devices (e.g., a touchpad or physical click wheel). Contact/motion module 830 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 830 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 830 and display controller 856 detect contact on a touchpad.

Contact/motion module 830 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 832 includes various known software components for rendering and displaying graphics on touch screen 812 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 832 stores data representing graphics to be used. Each graphic may be assigned a corresponding code. Graphics module 832 receives, from applications etc., one or more codes specifying graphics to be displayed along with, if necessary, coordinate data and other graphic property data, and then generates screen image data to output to display controller 856.

Text input module 834, which may be a component of graphics module 832, provides soft keyboards for entering text in various applications (e.g., contacts 837, e-mail 840, IM 841, browser 847, and any other application that needs text input).

GPS module 835 determines the location of the device and provides this information for use in various applications (e.g., to telephone 838 for use in location-based dialing, to camera 843 as picture/video metadata, and to applications that provide location-based services such as weather widgets, local yellow page widgets, and map/navigation widgets).

Applications 836 may include the following modules (or sets of instructions), or a subset or superset thereof:
  contacts module 837 (sometimes called an address book or contact list);
  telephone module 838;
  video conferencing module 839;
  e-mail client module 840;
  instant messaging (IM) module 841;
  workout support module 842;
  camera module 843 for still and/or video images;
  image management module 844;
  browser module 847;
  calendar module 848;
  widget modules 849, which may include one or more of:
    weather widget 849-1, stocks widget 849-2, calculator widget 849-3, alarm clock widget 849-4, dictionary widget 849-5, and other widgets obtained by the user, as well as user-created widgets 849-6;
  widget creator module 850 for making user-created widgets 849-6;
  search module 851;
  video and music player module 852, which may be made up of a video player module and a music player module;
  notes module 853;
  map module 854; and/or
  online video module 855.

Examples of other applications 836 that may be stored in memory 802 include other word processing applications, other image editing applications, drawing applications, presentation applications, JAVA-enabled applications, encryption, digital rights management, voice recognition, and voice replication.

In conjunction with touch screen 812, display controller 856, contact module 830, graphics module 832, and text input module 834, contacts module 837 may be used to manage an address book or contact list (e.g., stored in application internal state 857), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 838, video conference 839, e-mail 840, or IM 841; and so forth.

In conjunction with RF circuitry 808, audio circuitry 810, speaker 811, microphone 813, touch screen 812, display controller 856, contact module 830, graphics module 832, and text input module 834, telephone module 838 may be used to enter a sequence of characters corresponding to a telephone number, access one or more telephone numbers in address book 837, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 808, audio circuitry 810, speaker 811, microphone 813, touch screen 812, display controller 856, optical sensor 864, optical sensor controller 858, contact module 830, graphics module 832, text input module 834, contact list 837, and telephone module 838, videoconferencing module 839 includes executable instructions to initiate, conduct, and terminate a video conference between a user and one or more other participants in accordance with user instructions.

In conjunction with RF circuitry 808, touch screen 812, display controller 856, contact module 830, graphics module 832, and text input module 834, e-mail client module 840 includes executable instructions to create, send, receive, and manage e-mail in response to user instructions. In conjunction with image management module 844, e-mail client module 840 makes it very easy to create and send e-mails with still or video images taken with camera module 843.

In conjunction with RF circuitry 808, touch screen 812, display controller 856, contact module 830, graphics module 832, and text input module 834, the instant messaging module 841 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 808, touch screen 812, display controller 856, contact module 830, graphics module 832, text input module 834, GPS module 835, map module 854, and music player module 846, workout support module 842 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 812, display controller 856, optical sensor(s) 864, optical sensor controller 858, contact module 830, graphics module 832, and image management module 844, camera module 843 includes executable instructions to capture still images or video (including a video stream) and store them into memory 802, modify characteristics of a still image or video, or delete a still image or video from memory 802.

In conjunction with touch screen 812, display controller 856, contact module 830, graphics module 832, text input module 834, and camera module 843, image management module 844 includes executable instructions to arrange, modify (e.g., edit), or otherwise manipulate, label, delete, present (e.g., in a digital slide show or album), and store still and/or video images.

In conjunction with RF circuitry 808, touch screen 812, display system controller 856, contact module 830, graphics module 832, and text input module 834, browser module 847 includes executable instructions to browse the Internet in accordance with user instructions, including searching, linking to, receiving, and displaying web pages or portions thereof, as well as attachments and other files linked to web pages.

In conjunction with RF circuitry 808, touch screen 812, display system controller 856, contact module 830, graphics module 832, text input module 834, e-mail client module 840, and browser module 847, calendar module 848 includes executable instructions to create, display, modify, and store calendars and data associated with calendars (e.g., calendar entries, to do lists, etc.) in accordance with user instructions.

In conjunction with RF circuitry 808, touch screen 812, display system controller 856, contact module 830, graphics module 832, text input module 834, and browser module 847, widget modules 849 are mini-applications that may be downloaded and used by a user (e.g., weather widget 849-1, stocks widget 849-2, calculator widget 849-3, alarm clock widget 849-4, and dictionary widget 849-5) or created by the user (e.g., user-created widget 849-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 808, touch screen 812, display system controller 856, contact module 830, graphics module 832, text input module 834, and browser module 847, the widget creator module 850 may be used by a user to create widgets (e.g., turning a user-specified portion of a web page into a widget).

In conjunction with touch screen 812, display system controller 856, contact module 830, graphics module 832, and text input module 834, search module 851 includes executable instructions to search for text, music, sound, image, video, and/or other files in memory 802 that match one or more search criteria (e.g., one or more user-specified search terms) in accordance with user instructions.

In conjunction with touch screen 812, display system controller 856, contact module 830, graphics module 832, audio circuitry 810, speaker 811, RF circuitry 808, and browser module 847, video and music player module 852 includes executable instructions that allow the user to download and play back recorded music and other sound files stored in one or more file formats, such as MP3 or AAC files, and executable instructions to display, present or otherwise play back videos (e.g., on touch screen 812 or on an external, connected display via external port 824). In some embodiments, device 800 may include the functionality of an MP3 player.

In conjunction with touch screen 812, display controller 856, contact module 830, graphics module 832, and text input module 834, notes module 853 includes executable instructions to create and manage notes, to do lists, and the like in accordance with user instructions.

In conjunction with RF circuitry 808, touch screen 812, display system controller 856, contact module 830, graphics module 832, text input module 834, GPS module 835, and browser module 847, map module 854 may be used to receive, display, modify, and store maps and data associated with maps (e.g., driving directions; data on stores and other points of interest at or near a particular location; and other location-based data) in accordance with user instructions.

In conjunction with touch screen 812, display system controller 856, contact module 830, graphics module 832, audio circuitry 810, speaker 811, RF circuitry 808, text input module 834, e-mail client module 840, and browser module 847, online video module 855 includes instructions that allow the user to access, browse, receive (e.g., by streaming and/or download), play back (e.g., on the touch screen or on an external, connected display via external port 824), send an e-mail with a link to a particular online video, and otherwise manage online videos in one or more file formats, such as H.264. In some embodiments, instant messaging module 841, rather than e-mail client module 840, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 802 may store a subset of the modules and data structures identified above. Furthermore, memory 802 may store additional modules and data structures not described above.

In some embodiments, device 800 is a device where operation of a predefined set of functions on the device is performed exclusively through a touch screen and/or a touchpad. By using a touch screen and/or a touchpad as the primary input control device for operation of device 800, the number of physical input control devices (such as push buttons, dials, and the like) on device 800 may be reduced.

The predefined set of functions that may be performed exclusively through a touch screen and/or a touchpad include navigation between user interfaces. In some embodiments, the touchpad, when touched by the user, navigates device 800 to a main, home, or root menu from any user interface that may be displayed on device 800. In such embodiments, the touchpad may be referred to as a "menu button." In some other embodiments, the menu button may be a physical push button or other physical input control device instead of a touchpad.

Figure 9:
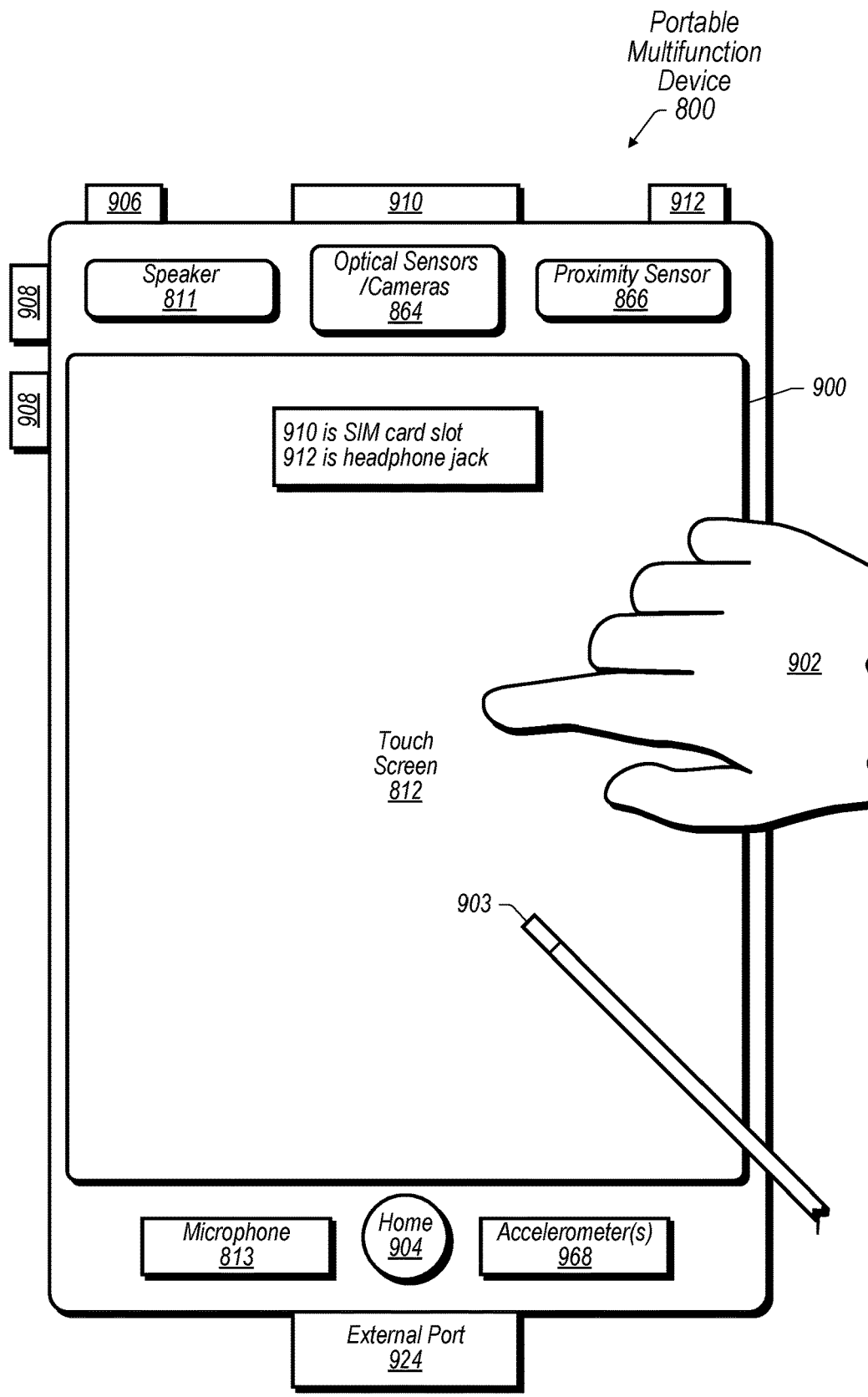
FIG. 9 illustrates a portable multifunction device that may include a camera module and that may implement OIS movement control with region-based blur reduction, in accordance with some embodiments.

FIG. 9 depicts illustrates an example portable multifunction device 800 that may include a camera module and that may implement OIS movement control with region-based blur reduction (e.g., as described above with reference to FIGS. 1-7), according to some embodiments. The device 800 may have a touch screen 812. The touch screen 812 may display one or more graphics within user interface (UI) 900. In this embodiment, as well as others described below, a user may select one or more of the graphics by making a gesture on the graphics, for example, with one or more fingers 902 (not drawn to scale in the figure) or one or more styluses 903 (not drawn to scale in the figure).

Device 800 may also include one or more physical buttons, such as "home" or menu button 904. As described previously, menu button 904 may be used to navigate to any application 836 in a set of applications that may be executed on device 800. Alternatively, in some embodiments, the menu button 904 is implemented as a soft key in a GUI displayed on touch screen 812.

In one embodiment, device 800 includes touch screen 812, menu button 904, push button 906 for powering the device on/off and locking the device, volume adjustment button(s) 908, Subscriber Identity Module (SIM) card slot 910, head set jack 912, and docking/charging external port 924. Push button 906 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 800 also may accept verbal input for activation or deactivation of some functions through microphone 813.

It should be noted that, although many of the examples herein are given with reference to optical sensor(s)/camera(s) 864 (on the front of a device), one or more rear-facing cameras or optical sensors that are pointed opposite from the display may be used instead of, or in addition to, an optical sensor(s)/camera(s) 864 on the front of a device.

Example Computer System

Figure 10:
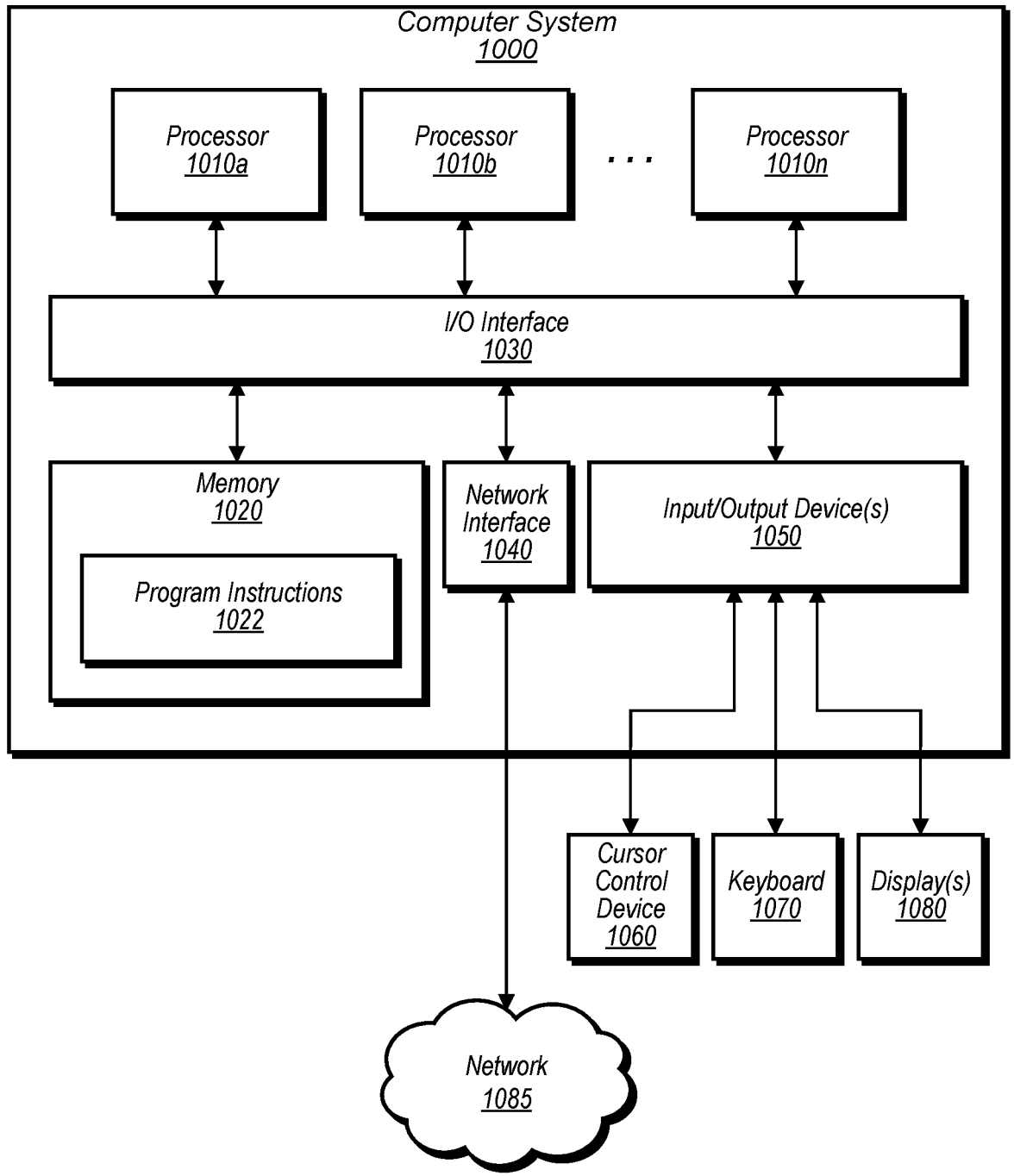
FIG. 10 illustrates an example computer system that may include a camera module and that may implement OIS movement control with region-based blur reduction, in accordance with some embodiments.

FIG. 10 illustrates an example computer system 1000 that may include a camera module and that may implement OIS movement control with region-based blur reduction (e.g., as described above with reference to FIGS. 1-7), according to some embodiments. The computer system 1000 may be configured to execute any or all of the embodiments described above. In different embodiments, computer system 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1000, which may interact with various other devices. Note that any component, action, or functionality described above with respect to FIGS. 1-9 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store camera control program instructions 1022 and/or camera control data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1022 may be configured to implement a lens control application 1024 incorporating any of the functionality described above. Additionally, existing camera control data 1032 of memory 1020 may include any of the information or data structures described above. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures, any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 (e.g., carrier or agent devices) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1022, which may be processor-executable to implement any element or action described above. In one embodiment, the program instructions may implement the methods described above. In other embodiments, different elements and data may be included. Note that data may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations.

Additional descriptions of embodiments (example clauses):

Clause 1: A device, comprising: a camera module, comprising: a lens group comprising one or more lenses; an image sensor to capture light that has passed through the lens group; and an actuator to move at least one of the lens group or the image sensor; one or more motion sensors to obtain motion data associated with motion of at least one of the camera module or the device; and one or more processors to: determine a target region of the image sensor; and implement optical image stabilization (OIS) movement control according to a region-based blur reduction model that effects a greater reduction in blur associated with the target region relative to one or more other regions of the image sensor, wherein, to implement the OIS movement control, the one or more processors are to: determine, based at least in part on the motion data, one or more OIS drive signals for implementing the OIS movement control according to the region-based blur reduction model; and control the actuator to move the at least one of the lens group or the image sensor according to the OIS drive signals.

Clause 2: The device of Clause 1, wherein: the camera module further comprises: one or more position sensors to obtain position data associated with positioning of the at least one of the lens group or the image sensor; and to determine the one or more OIS drive signals for implementing the OIS movement control, the one or more processors are to: input, into the region-based blur reduction model, at least a portion of the motion data and at least a portion of the position data, wherein the region-based blur reduction model is configured to produce an output based at least in part on the input; and determine the one or more OIS drive signals based at least in part on the output from the region-based blur reduction model.

Clause 3: The device of any of Clauses 1 or 2, wherein the target region comprises a region of interest (ROI) of the image sensor.

Clause 4: The device of Clause 3, further comprising: a touchscreen display; wherein the one or more processors are further to: receive one or more inputs associated with one or more touches detected via the touchscreen display; and determine the ROI based at least in part on the one or more inputs.

Clause 5: The device of Clause 4, wherein: the one or more processors are further to: present one or more images on the touchscreen display; and the one or more inputs comprise an input associated with a touch detected via the touchscreen display while an image of the one or more images is presented on the display.

Clause 6: The device of any of Clauses 1-5, wherein the target region is a central region that includes and surrounds a center point of the image sensor.

Clause 7: The device of any of Clauses 1-6, wherein the one or more processors implement OIS movement control according to the region-based blur reduction model such that blur in the target region is minimized.

Clause 8: A system, comprising: a camera module, comprising: a lens group comprising one or more lenses; an image sensor to capture light that has passed through the lens group; an actuator to move at least one of the lens group or the image sensor; and one or more position sensors to obtain position data associated with positioning of the at least one of the lens group or the image sensor; and a controller to: determine a target region of the image sensor; and implement optical image stabilization (OIS) movement control according to a region-based blur reduction model that effects a greater reduction in blur associated with the target region relative to one or more other regions of the image sensor wherein, to implement the OIS movement control, the controller is to: determine, based at least in part on the position data, one or more OIS drive signals for implementing the OIS movement control according to the region-based blur reduction model; and control the actuator to move the at least one of the lens group or the image sensor according to the OIS drive signals.

Clause 9: The system of Clause 8, further comprising: one or more motion sensors to obtain motion data associated with motion of the camera module; wherein, to determine the one or more OIS drive signals for implementing the OIS movement control, the controller uses at least a portion of the motion data and at least a portion of the position data as inputs to the region-based blur reduction model.

Clause 10: The system of any of Clauses 8 or 9, wherein: the controller controls, via the one or more OIS drive signals, the actuator so as to implement the OIS movement control according to the region-based blur reduction model during an image capture time period in which an image is captured using the camera module; and based on implementation, during the image capture time period, of the OIS movement control according to the region-based blur reduction model, the image comprises: a first maximum amount of blur in a first portion of the image associated with the target region; and a second maximum amount of blur in a second portion of the image associated with the one or more other regions, wherein the second maximum amount of blur is greater than the first maximum amount of blur.

Clause 11: The system of any of Clauses 8-10, wherein: the controller controls, via the one or more OIS drive signals, the actuator so as to implement the OIS movement control according to the region-based blur reduction model during an image capture time period in which an image is captured using the camera module; and based on implementation, during the image capture time period, of the OIS movement control according to the region-based blur reduction model, the image comprises: a first maximum amount of blur in a first portion of the image associated with the target region; and a second maximum amount of blur at a center point of the image, wherein the second maximum amount of blur is greater than the first maximum amount of blur.

Clause 12: The system of any of Clauses 8-11, wherein, to implement the OIS movement control according to the region-based blur reduction model, the controller is configured to control the actuator to move the at least one of the lens group or the image sensor in one or more directions orthogonal to an optical axis of the camera module.

Clause 13: The system of Clause 12, wherein: the actuator comprises a voice coil motor (VCM) actuator; and the controller is further to: cause the actuator to move at least one of the lens group or the image sensor in a direction parallel to the optical axis to provide focus movement for images captured via the camera module.

Clause 14: The system of any of Clauses 8-12, wherein the target region is a region of interest (ROI) that is selected based at least in part using object detection configured to classify one or more types of objects in a scene captured via the camera module.

Clause 15: The system of any of Clauses 8-14, wherein the target region is a central region that includes and surrounds a center point of the image sensor.

Clause 16: A method, comprising: obtaining, via one or more motion sensors, motion data associated with motion of a camera module; obtaining, via one or more position sensors, position data associated with at least one of a lens group of the camera module or an image sensor of the camera module; and implementing optical image stabilization (OIS) movement control according to a region-based blur reduction model that effects a greater reduction in blur associated with a target region of the image sensor, relative to one or more other regions of the image sensor, wherein the implementing the OIS movement control comprises: determining, based at least in part on the motion data and the position data, one or more OIS drive signals for implementing the OIS movement control according to the region-based blur reduction model; and moving, via the actuator, the at least one of a lens group of the camera module or an image sensor of the camera module, according to the OIS drive signals.

Clause 17: The method of Clause 16, wherein the moving the at least one of the lens group or the image sensor comprises: moving the at least one of the lens group or the image sensor in one or more directions orthogonal to an optical axis of the camera module, according to the OIS drive signals.

Clause 18: The method of any of Clauses 16 or 17, further comprising: determining the target region based at least in part on a region of interest (ROI) selected via a touchscreen display of a device comprising the camera module.

Clause 19: The method of any of Clauses 16-18, further comprising: determining the target region based at least in part on a ROI selected based at least in part using object detection configured to classify one or more types of objects in a scene captured via the camera module.

Clause 20: The method of any of Clauses 16-19, further comprising: determining the target region based at least in part on one or more device settings associated with a device comprising the camera module.

Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
    a camera module, comprising:
        a lens group comprising one or more lenses,
        an image sensor to capture light that has passed through the lens group, and
        an actuator to move at least one of the lens group or the image sensor;
    one or more motion sensors to obtain motion data associated with motion of at least one of the camera module or the device; and
    one or more processors to:
        determine one or more target regions of the image sensor for image stabilization, wherein the one or more target regions are regions of a plurality of predetermined regions on the image sensor, wherein respective regions of the plurality of predetermined regions comprises respective pluralities of pixels, wherein the determined one or more target regions include an object depicted in a projection on the image sensor,
        implement optical image stabilization (OIS) movement control according to a region-based blur reduction model that effects a greater reduction in blur associated with the determined one or more target regions relative to one or more other regions of the plurality of predetermined regions of the image sensor, and wherein, to implement the OIS movement control, the one or more processors are to:
            determine, based at least in part on the motion data, one or more OIS drive signals for implementing the OIS movement control according to the region-based blur reduction model, wherein the OIS movement control moves at least one of the lens group or the image sensor in response to movement of the camera module relative to the object depicted in the projection on the determined one or more target regions of the image sensor to compensate for the movement of the camera module relative to the object depicted in the projection on the determined one or more target regions of the image sensor, and
            control the actuator to move the at least one of the lens group or the image sensor according to the OIS drive signals.

2. The device of claim 1, wherein:
    the camera module further comprises:
        one or more position sensors to obtain position data associated with positioning of the at least one of the lens group or the image sensor; and
    to determine the one or more OIS drive signals for implementing the OIS movement control, the one or more processors are to:
        input, into the region-based blur reduction model, at least a portion of the motion data and at least a portion of the position data, wherein the region-based blur reduction model is configured to produce an output based at least in part on the input; and determine the one or more OIS drive signals based at least in part on the output from the region-based blur reduction model.

3. The device of claim 1, wherein the determined one or more target regions comprise a region of interest (ROI) of the image sensor.

4. The device of claim 3, further comprising:
a touchscreen display;
wherein the one or more processors are further to:
receive one or more inputs associated with one or more touches detected via the touchscreen display; and
determine the ROI based at least in part on the one or more inputs.

5. The device of claim 4, wherein:
the one or more processors are further to:
present one or more images on the touchscreen display; and
the one or more inputs comprise an input associated with a touch detected via the touchscreen display while an image of the one or more images is presented on the display.

6. The device of claim 1, wherein the determined one or more target regions are a central region that includes and surrounds a center point of the image sensor.

7. The device of claim 1, wherein the one or more processors implement the OIS movement control according to the region-based blur reduction model such that blur in the target region is minimized.

8. A system, comprising:
a camera module, comprising:
a lens group comprising one or more lenses,
an image sensor to capture light that has passed through the lens group,
an actuator to move at least one of the lens group or the image sensor, and
one or more position sensors to obtain position data associated with positioning of the at least one of the lens group or the image sensor; and
one or more processors to:
determine one or more target regions of the image sensor for image stabilization, wherein the one or more target regions are regions of a plurality of predetermined regions on the image sensor, wherein respective regions of the plurality of predetermined regions comprises respective pluralities of pixels, wherein the determined one or more target regions include an object depicted in a projection on the image sensor, and
implement optical image stabilization (OIS) movement control according to a region-based blur reduction model that effects a greater reduction in blur associated with the determined one or more target regions relative to one or more other regions of the plurality of predetermined regions of the image sensor, and wherein, to implement the OIS movement control, the one or more processors are to:
determine, based at least in part on the position data, one or more OIS drive signals for implementing the OIS movement control according to the region-based blur reduction model, wherein the OIS movement control moves at least one of the lens group or the image sensor in response to movement of the camera module relative to the object depicted in the projection on the determined one or more target regions of the image sensor to compensate for movement of the camera module relative to the object depicted in the projection on the determined one or more target regions of the image sensor, and
control the actuator to move the at least one of the lens group or the image sensor according to the OIS drive signals.

9. The system of claim 8, further comprising:
one or more motion sensors to obtain motion data associated with motion of the camera module;
wherein, to determine the one or more OIS drive signals for implementing the OIS movement control, the one or more processors use at least a portion of the motion data and at least a portion of the position data as inputs to the region-based blur reduction model.

10. The system of claim 8, wherein:
the one or more processors control, via the one or more OIS drive signals, the actuator so as to implement the OIS movement control according to the region-based blur reduction model during an image capture time period in which an image is captured using the camera module; and
based on implementation, during the image capture time period, of the OIS movement control according to the region-based blur reduction model, the image comprises:
a first maximum amount of blur in a first portion of the image associated with the determined one or more target regions; and
a second maximum amount of blur in a second portion of the image associated with the one or more other regions, wherein the second maximum amount of blur is greater than the first maximum amount of blur.

11. The system of claim 8, wherein:
the one or more processors control, via the one or more OIS drive signals, the actuator so as to implement the OIS movement control according to the region-based blur reduction model during an image capture time period in which an image is captured using the camera module; and
based on implementation, during the image capture time period, of the OIS movement control according to the region-based blur reduction model, the image comprises:
a first maximum amount of blur in a first portion of the image associated with the determined one or more target regions; and
a second maximum amount of blur at a center point of the image, wherein the second maximum amount of blur is greater than the first maximum amount of blur.

12. The system of claim 8, wherein, to implement the OIS movement control according to the region-based blur reduction model, the one or more processors are configured to control the actuator to move the at least one of the lens group or the image sensor in one or more directions orthogonal to an optical axis of the camera module.

13. The system of claim 12, wherein:
the actuator comprises a voice coil motor (VCM) actuator; and
the one or more processors are further to:
cause the actuator to move at least one of the lens group or the image sensor in a direction parallel to the optical axis to provide focus movement for images captured via the camera module.

14. The system of claim 8, wherein the determined one or more target regions are a region of interest (ROI) that is selected based at least in part using object detection configured to classify one or more types of objects in a scene captured via the camera module.

15. The system of claim 8, wherein the determined one or more target regions are a central region that includes and surrounds a center point of the image sensor.

16. A method, comprising:
  obtaining, via one or more motion sensors, motion data associated with motion of a camera module;
  obtaining, via one or more position sensors, position data associated with at least one of a lens group of the camera module or an image sensor of the camera module; and
  implementing optical image stabilization (OIS) movement control according to a region-based blur reduction model that effects a greater reduction in blur associated with one or more target regions of the image sensor for image stabilization, relative to one or more other regions of the image sensor, wherein the one or more target regions are regions of a plurality of predetermined regions on the image sensor, wherein respective regions of the plurality of predetermined regions comprises respective pluralities of pixel, wherein the one or more target regions include an object depicted in a projection on the image sensor, and wherein the implementing the OIS movement control comprises:
    determining, based at least in part on the motion data and the position data, one or more OIS drive signals for implementing the OIS movement control according to the region-based blur reduction model, wherein the OIS movement control moves at least one of the lens group or the image sensor in response to movement of the camera module relative to the object depicted in the projection on the one or more target regions of the image sensor to compensate for movement of the camera module relative to the object depicted in the projection on the one or more target regions of the image sensor, and
    moving, via the actuator, the at least one of a lens group of the camera module or an image sensor of the camera module, according to the OIS drive signals.

17. The method of claim 16, wherein the moving the at least one of the lens group or the image sensor comprises:
  moving the at least one of the lens group or the image sensor in one or more directions orthogonal to an optical axis of the camera module, according to the OIS drive signals.

18. The method of claim 16, further comprising:
  determining the one or more target regions based at least in part on a region of interest (ROI) selected via a touchscreen display of a device comprising the camera module.

19. The method of claim 16, further comprising:
  determining the one or more target regions based at least in part on a ROI selected based at least in part using object detection configured to classify one or more types of objects in a scene captured via the camera module.

20. The method of claim 16, further comprising:
  determining the one or more target regions based at least in part on one or more device settings associated with a device comprising the camera module.

\* \* \* \* \*